United States Patent
Barnum et al.

(10) Patent No.: US 10,818,123 B2
(45) Date of Patent: Oct. 27, 2020

(54) FOOD PRODUCT STORAGE AND VENDING KIOSK

(71) Applicant: COMMERCIAL AUTOMATION, LLC, Lansing, KS (US)

(72) Inventors: Beverly A. Barnum, Irvine, CA (US); Adrian M. Abordo, Oceanside, CA (US); Ryan Michael Rodriguez, Rancho Santa Margarita, CA (US); Michael Jay Dobie, Lewisville, TX (US); Neal S. Cooper, N. Richland Hills, TX (US)

(73) Assignee: COMMERCIAL AUTOMATION, LLC, Lansing, KS (US)

( * ) Notice: Subject to any disclaimer, the term of this patent is extended or adjusted under 35 U.S.C. 154(b) by 0 days.

(21) Appl. No.: 16/184,563

(22) Filed: Nov. 8, 2018

(65) Prior Publication Data
US 2019/0139353 A1 May 9, 2019

Related U.S. Application Data

(60) Provisional application No. 62/583,123, filed on Nov. 8, 2017.

(51) Int. Cl.
*G07F 11/04* (2006.01)
*A21D 13/41* (2017.01)
(Continued)

(52) U.S. Cl.
CPC ............. *G07F 11/04* (2013.01); *A21D 13/41* (2017.01); *G07F 9/105* (2013.01); *G07F 11/10* (2013.01); *G07F 11/22* (2013.01); *G07F 17/0078* (2013.01)

(58) Field of Classification Search
CPC .......... G07F 11/16; G07F 11/04; G07F 9/105; G07F 11/10; G07F 17/0078; A21D 13/41
(Continued)

(56) References Cited

U.S. PATENT DOCUMENTS

| 3,653,541 A | 4/1972 | Crum |
| 4,513,879 A | 4/1985 | Reiss |

(Continued)

FOREIGN PATENT DOCUMENTS

| CN | 206421513 U | 8/2017 |
| DE | 102004010058 A1 | 9/2005 |

(Continued)

OTHER PUBLICATIONS

United States Patent and Trademark Office, International Search Report and Written Opinion issued in corresponding Application No. PCT/US2018/059852, dated Jan. 18, 2019.

(Continued)

*Primary Examiner* — Rakesh Kumar
(74) *Attorney, Agent, or Firm* — Stites & Harbison, PLLC; Jeffrey A. Haeberlin; Gary N. Stewart

(57) ABSTRACT

A food product storage and vending kiosk includes a cold storage unit, an oven unit, and a transportation mechanism. The cold storage unit includes a plurality of food packages, an active shelving system storing the plurality of food packages, and a freezer. Each of the food packages includes a food product in a box. The oven unit includes a base oven deck for receiving the food product and rising to meet and seal with a main body to form a sealed oven cavity for cooking the food product. The transportation mechanism is for moving a food package out of the cold storage unit, onto an elevator platform that lifts the food package to the oven unit, pushing the food product from the box onto the base (Continued)

oven deck for cooking, and pushing the food product off of the base oven deck into the box and out of a delivery chute.

4 Claims, 26 Drawing Sheets

(51) Int. Cl.
*G07F 17/00* (2006.01)
*G07F 9/10* (2006.01)
*G07F 11/22* (2006.01)
*G07F 11/10* (2006.01)

(58) Field of Classification Search
USPC .................................................. 221/150 HC
See application file for complete search history.

(56) References Cited

U.S. PATENT DOCUMENTS

| | | | |
|---|---|---|---|
| 5,048,719 A | 9/1991 | Empl et al. | |
| 5,105,979 A * | 4/1992 | Bakx | G07F 9/105 |
| | | | 221/150 HC |
| 5,144,879 A | 9/1992 | Alessi | |
| 5,449,888 A * | 9/1995 | Smith | G07F 9/105 |
| | | | 219/400 |
| 5,503,300 A * | 4/1996 | Prescott | G07F 9/026 |
| | | | 221/105 |
| 5,772,072 A | 6/1998 | Prescott et al. | |
| 5,975,348 A | 11/1999 | Rudewicz et al. | |
| 6,072,163 A * | 6/2000 | Armstrong | H01L 21/67103 |
| | | | 118/724 |
| 6,095,036 A | 8/2000 | Tocchet | |
| 6,550,632 B2 | 4/2003 | Gubbini et al. | |
| 8,710,408 B2 | 4/2014 | Khatchadourian et al. | |
| 9,361,746 B2 * | 6/2016 | Otzen | G07F 11/165 |
| 2012/0263847 A1 * | 10/2012 | Poli | G07F 9/105 |
| | | | 426/520 |
| 2014/0224826 A1 * | 8/2014 | Otzen | G07F 11/165 |
| | | | 221/1 |
| 2019/0139353 A1 * | 5/2019 | Barnum | G07F 9/105 |

FOREIGN PATENT DOCUMENTS

| | | | | |
|---|---|---|---|---|
| EP | 2680242 A1 | | 1/2014 | |
| FR | 2754087 A1 * | | 4/1998 | H05B 6/808 |
| FR | 2761759 A1 * | | 10/1998 | G07F 9/105 |
| GB | 2209329 A | | 5/1989 | |
| GB | 2310990 A * | | 9/1997 | G07F 17/0078 |
| KR | 980009359 U | | 4/1998 | |
| KR | 100653237 B1 | | 12/2006 | |
| KR | 10-2009-0073320 A | | 7/2009 | |
| KR | 20090073320 A * | | 7/2009 | |
| KR | 101090647 B1 | | 12/2011 | |
| KR | 101090647 B1 * | | 12/2011 | G07F 11/00 |
| KR | 10-1497954 B1 | | 3/2015 | |
| WO | 92/07340 | | 4/1992 | |
| WO | 03/077213 A1 | | 9/2003 | |
| WO | WO-03077213 A1 * | | 9/2003 | G07F 17/0078 |
| WO | 2005/015509 A1 | | 2/2005 | |
| WO | WO-2005015509 A1 * | | 2/2005 | G07F 9/105 |

OTHER PUBLICATIONS

Morin, T., "Happy vendings: Will pizza vending machines change the way we sell pizza, or are they just another marketing tool?" PMQ Pizza Magazine, 2018.
Larry Fire Gadgets, "Let's Pizza Vending Machine Coming to the US." 2012.
"Japan's First Pizza Vending Machine Provides (Almost) Instant Hot Pizza." Pizza Self, 2018.

* cited by examiner

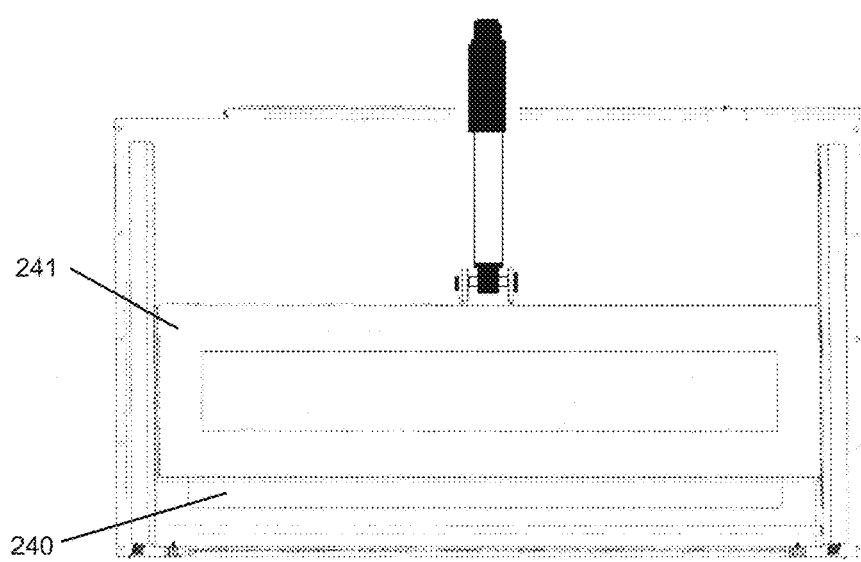
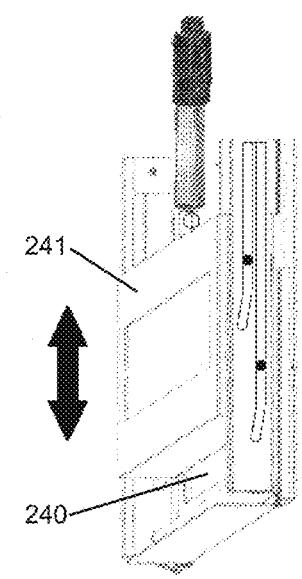
FIG. 16A  FIG. 16B
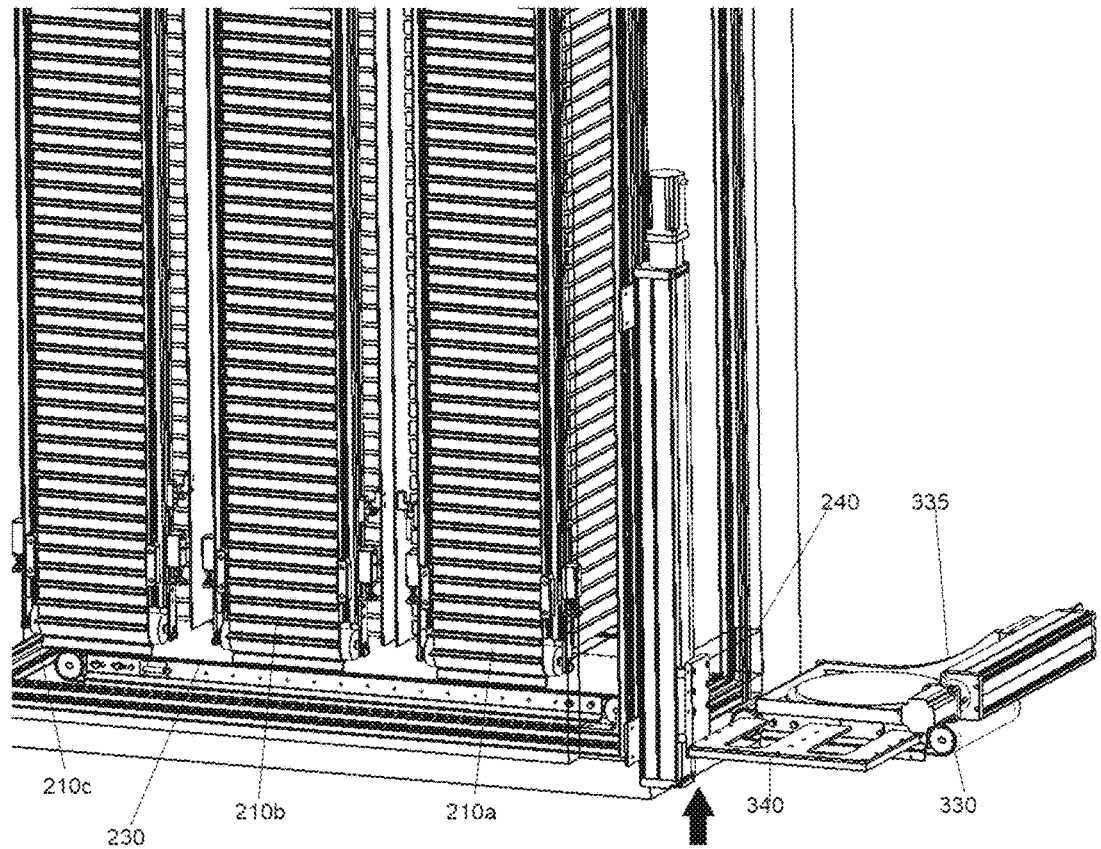
FIG. 17

FIG. 25A
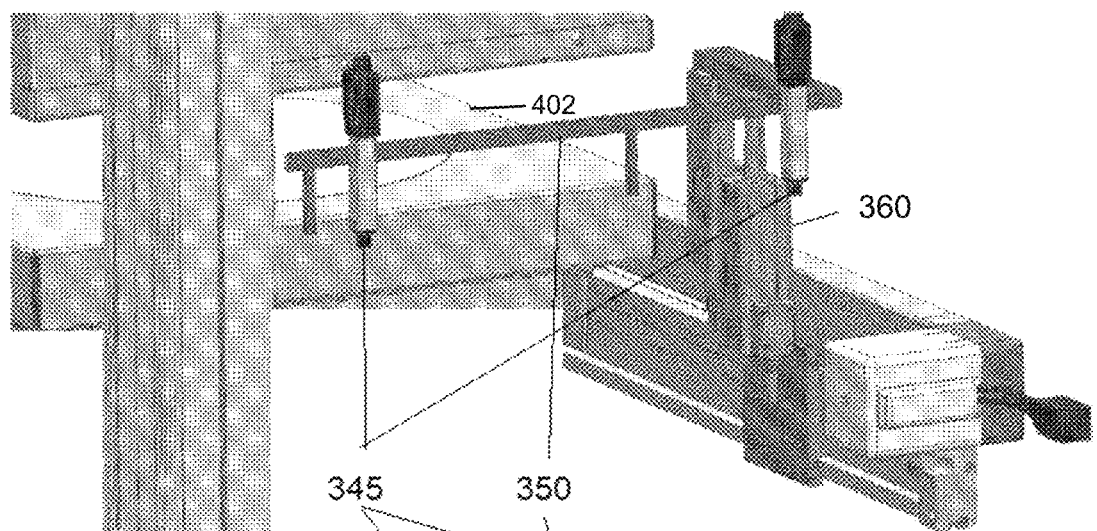
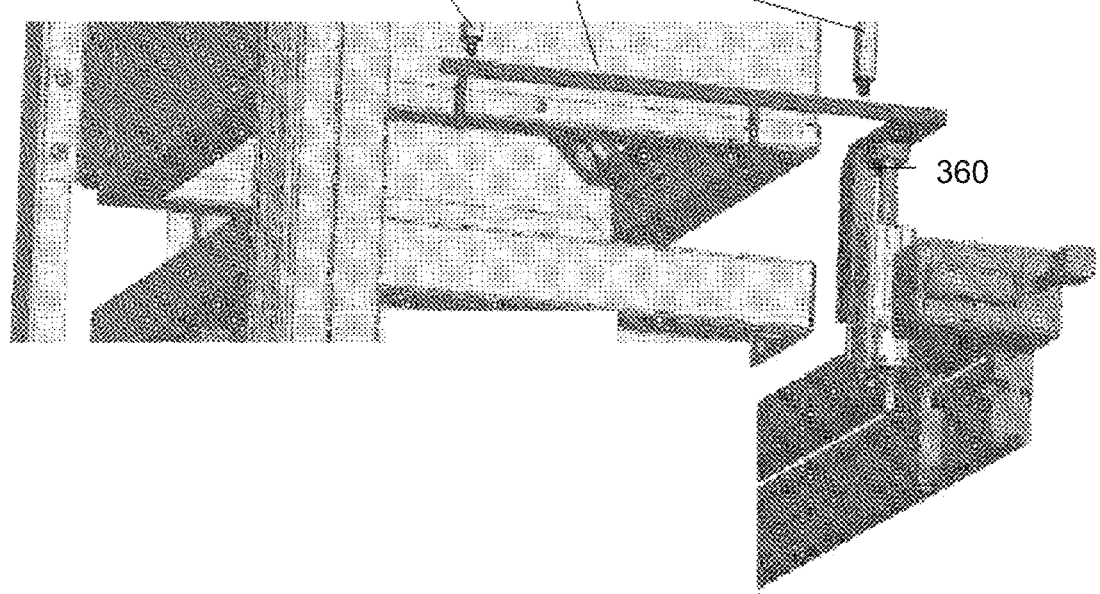
FIG. 25B

FOOD PRODUCT STORAGE AND VENDING KIOSK

CROSS-REFERENCE TO RELATED APPLICATIONS

This application claims the benefit of U.S. Provisional Patent Application No. 62/583,123, filed Nov. 8, 2017, the entire disclosure of which is hereby incorporated by reference.

BACKGROUND OF THE INVENTION

1. Field of the Invention

The present invention pertains to the field of vending machines (kiosks). In particular, the invention relates to a food product storage and vending kiosk with a cold storage unit, a rapid-cook (non-microwave) oven unit, and a transportation mechanism for moving a food product from the storage unit to the oven unit to a customer.

2. Background Art

A problem that has been identified is how to safely store and rapidly cook a food product and dispense the cooked food product to a consumer in a stand-alone kiosk. Other available machines do not have this unique set of capabilities that is scalable to mass production. There are vending machines that distribute food to consumers following a transaction, whereby the consumer can select from a variety of offerings. Some kiosks can vend hot food. Such vending machines typically include a cooling container to store food, an oven for cooking, a mechanism to transport food between the cooler and oven, and a mechanism to dispense the food to the consumer. A majority of the kiosks utilize refrigerators sustaining only limited shelf life for perishable food products. Additionally, the ovens for most of the kiosks use microwave technology, providing unsatisfactory reheating in terms of temperature control and food texture. Furthermore, the other available machines have a an overall dispense time (comprised of pre-heating, plus cook time) that is too long, so customers get impatient and choose not to use the machine.

BRIEF SUMMARY OF THE INVENTION

The invention is a self-contained automated food product storage and vending machine (i.e., kiosk) whereby packaged food products like pizza are stored inside a freezer/refrigeration unit (i.e., a cold storage unit). The kiosk includes: the freezer/refrigeration unit, a transportation mechanism, and an oven unit, as described in more detail below.

The freezer/refrigeration unit holds a plurality of columns of packed foodstuff, supported by rigid braces and subsequently transported to an adjacent oven unit, where the food is heated prior to its delivery to a customer. The active shelving allows for the discrete dispensing of an individual food item from one of the columns. In order to facilitate replenishment of the packaged food products as well as for cleaning, the shelving columns are top-mounted on telescopic rails, which allow a single shelving column at a time to be pulled out of the machine for access.

In one embodiment, the package is a box which is pre-folded to form a three-sided tray. The package is used as a shelf for cold storage and to transport the foodstuff to the oven. The foodstuff is removed from the tray for cooking, and upon completion of cooking, the pizza is returned to the tray for delivery to the customer, who can manually release the flap and rotate the lid over to securely close the box for transport.

The transport mechanism for moving the pizza out of the box and back into the box following heating utilizes a pushing element "wrangler" device. This shepherding device is able to guide transfer of the pizza out of the box and onto the deck of the oven. Upon completion, the back-side of the wrangler (which may or may not be the front face); with an attached optional scraper to clear the oven surface, will steer the hot pizza off the hot oven deck and onto the un-heated box.

The kiosk contains an oven for the preparation of the pizza which utilizes multiple cooking methods (comprised of at least one heating element and at least one air circulation element) and ventless operation within a single oven compartment. The specialized "rapid cook" unit features three fundamental heat transfer methods: [heated air-circulation] forced convection air impingement, [Infrared] radiation and [deck] conduction, NOT using microwave technology. The combination leads to faster preparation of the pizza. The oven unit is equipped with a catalytic converter on the exhaust, which breaks down grease-laden vapors and smoke for ventless operation. Furthermore, the oven is opened by lowering the bottom part relative to the top part. This open-side down design helps to retain heat within the oven even during the insertion and removal of the pizza to/from the oven.

The kiosk may also include a mechanism in the freezer having a hatch cover formed with an insulating material and slotted guides constrained on both sides. The hatch cover is prevented from canting by guides on each side. The hatch cover is attached fixedly to the shaft of a motor. When the motor is actuated linearly, it lifts the door, the door slides open in a mostly vertical fashion. The door is fully closed at the bottom position. In the case of a power failure, gravity will maintain the hatch door in the closed and sealed position.

Accordingly, in one aspect of the invention, a food product storage and vending kiosk includes a cold storage unit, an oven unit, and a transportation mechanism. The cold storage unit includes a plurality of food packages, an active shelving system storing the plurality of food packages, and a refrigerator for maintaining an interior of the cold storage unit at a predetermined temperature. Each of the food packages includes a food product in a box. The oven unit includes a base oven deck for receiving the food product and rising to meet and seal with a main body to form a sealed oven cavity for cooking the food product. The transportation mechanism is for moving a food package out of the cold storage unit, onto an elevator platform that lifts the food package to the oven unit, pushing the food product from the box onto the base oven deck for cooking, and pushing the food product off of the base oven deck into the box and pushing the re-packaged food out of a delivery chute of the kiosk after cooking.

In one implementation, the box of each of the plurality of food packages has an open top and an open front forming a three-sided tray containing the food product, and the active shelving system includes a plurality of columns of shelf elements supporting and dispensing the plurality of food packages.

Each of the plurality of columns of shelf elements may include two parallel Archimedes screws and screw actuators. An outer diameter and pitch of each of the Archimedes screws is configured such that one of the plurality of food packages is capable of being supported between threads of each of the screws and synchronized rotation of the Archimedes screws by the screw actuators lowers the column until a food package drops free of the column.

Alternatively, each of the plurality of columns of shelf elements may include two parallel vertical conveyor belts and belt actuators. Cleats attached to each of the conveyor belts are configured such that one of the plurality of food packages is capable of being supported between cleats of each of the conveyor belts and such that synchronized movement of the conveyor belts lowers the column until a food package drops free of the column.

In another implementation, each of the columns of shelf elements is mounted on a telescopic rail which allows the respective column of shelf elements to be pulled out by machine maintenance personnel for access to clean or replenishment of food packages.

In yet another implementation, the base oven deck includes a heated platen that comes in direct contact with the food product, and the main body includes at least one circular radiant element, a plenum on both sides of the oven cavity, a motor-driven fan on top of the main body that pressurizes the plenum, a return opening to the motor driven fan, a return duct from the oven cavity to the return opening, open coil heaters in the return duct, and impingement jets fed by the plenum. The circular radiant element(s) is (are) in a center area of the oven cavity. The impingement jets deliver heated air to exposed surfaces of the food product. Thus, that the oven unit includes impingement, radiation, and conduction heat transfer methods.

The main body of the oven unit may further include a vent open to the plenum for exhaust from the oven unit, and an electrically heated catalyst in the vent to remove hydrocarbons in the exhaust.

In still yet another implementation, the cold storage unit defines a hatch between an interior of the cold storage unit and an oven compartment wherein the oven unit is located, and includes a motorized hatch cover over the hatch. Then, the transportation mechanism includes a storage unit conveyor below the active shelving system and an oven-side conveyor in alignment with the hatch. The storage unit conveyor and the oven-side conveyor are for transporting a food package from the storage unit, through the hatch, and into the oven compartment.

The transportation mechanism may also include a sweeper arm assembly and an elevator assembly positioned at opposite sides of the oven-side conveyor. The elevator assembly includes the elevator platform and an elevator actuator for lifting the elevator platform from a bottom of the oven compartment to the oven unit and the delivery chute. The sweeper arm assembly includes a stopper bar oriented perpendicular to a direction of travel of the oven-side conveyor, a sweeper bar oriented parallel with the direction of travel of the oven-side conveyor, and a sweeper actuator for causing the sweeper bar to sweep the food package off the oven-side conveyor and onto the elevator platform.

The transportation mechanism may further include a pair of box retention finger actuators and a wrangler assembly located in the oven compartment at/adjacent to the oven unit. The two box retention finger actuators engage the box of the food package when the elevator actuator has lifted the elevator platform to the oven unit. The wrangler assembly includes a front-side member, a back-side member, and a loading/unloading actuator. The loading/unloading actuator is for causing the front-side member to push the food product out the open front of the box onto the base oven deck before cooking and for causing the back-side member to push the food product from the base oven deck back into the box after cooking. Then, after retraction of the two box retention finger actuators, the loading/unloading actuator is for pushing the food product and box out through the delivery chute.

The wrangler assembly may further include a motorized lifting module for raising the front-side member and back-side member of the wrangler assembly enough to clear the food product as the loading/unloading actuator moves back to the elevator platform after pushing the food product onto the base oven deck before cooking and back to the base oven deck before pushing the food product back into the box after cooking.

Additionally, the back-side member of the wrangler may further include a scraper to scrape crumbs off a surface of the base oven deck into a gap defined between the base oven deck and the box as the loading/unloading actuator causes the back-side member of the wrangler assembly to push the food product from the base oven deck back into the box after cooking.

BRIEF DESCRIPTION OF THE SEVERAL VIEWS OF THE DRAWINGS

These and other features, aspects, and advantages of the present invention will become better understood with regard to the following description, appended claims, and accompanying drawings where:

FIG. 16A is a side view of an exemplary transfer hatch and cover.

FIG. 16B is a perspective view of the transfer hatch and cover of FIG. 16A.

FIG. 17 is another perspective view of the storage unit and transportation mechanism of FIG. 12, with selected elements hidden for clarity, showing a sweeping actuator and elevator platform in the loading position;

FIG. 25A is another partial perspective view of the transportation mechanism and the oven unit, with selected elements hidden for clarity, showing an exemplary wrangler with a lifting actuator;

FIG. 25B is another partial perspective view of the exemplary wrangler with a lifting actuator of FIG. 25A;

DETAILED DESCRIPTION OF EXEMPLARY EMBODIMENTS OF THE INVENTION

The details of one or more embodiments of the presently-disclosed subject matter are set forth below and in attachments to this document. Modifications to embodiments described below and in the attachments, and other embodiments, will be evident to those of ordinary skill in the art after a study of the information provided in these attachments. The information provided in these attachments, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by one of ordinary skill in the art, definitions are set forth herein to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a," "an," and "the" refer to "one or more" when used in this application, including the claims/sample claims.

Throughout this description, the term "actuator" will be used to indicate an apparatus that imparts a desired mechanical motion to another component; it is a "mover".

Figure 1:
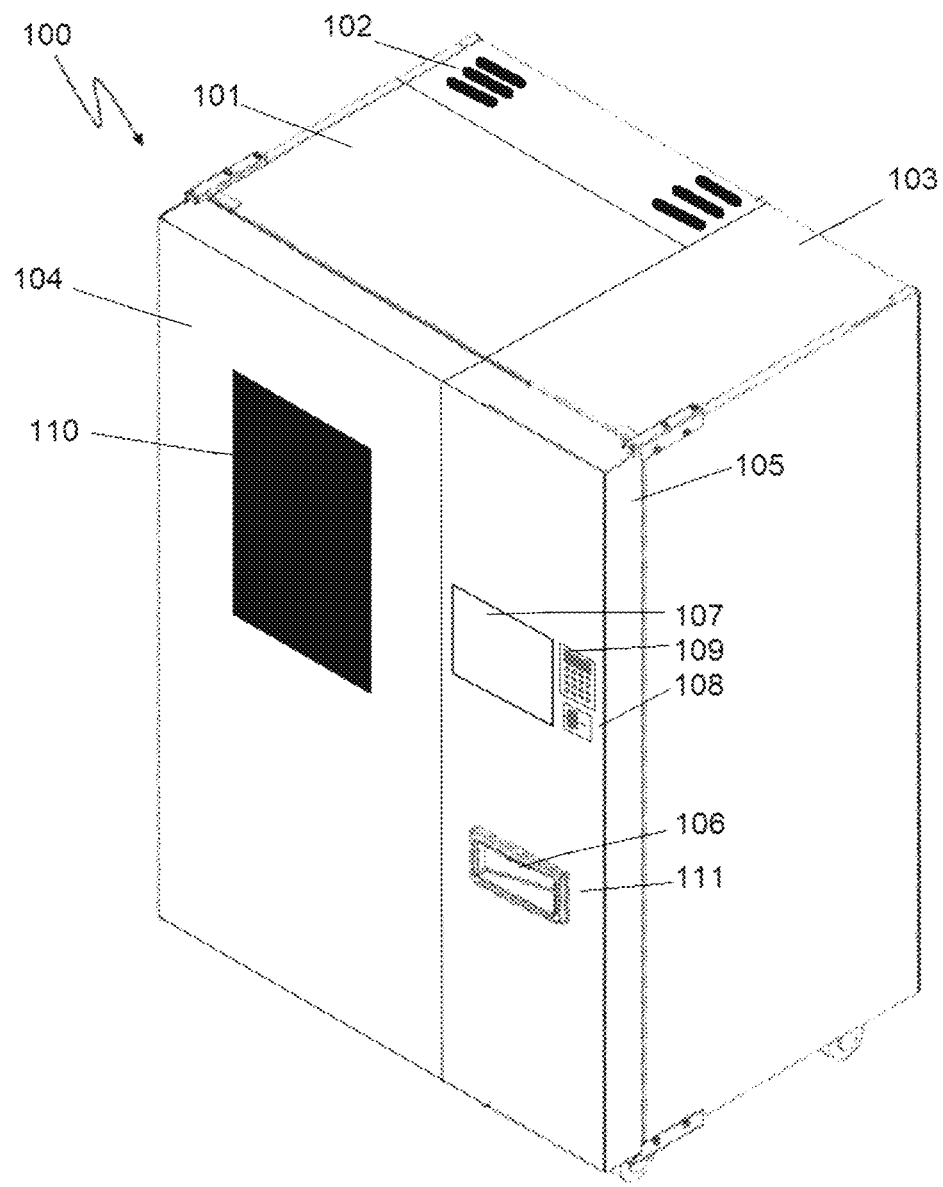
FIG. 1 is a perspective view of an exemplary vending machine (kiosk) according to the invention.

FIG. 1 shows an exemplary food product storage and vending kiosk 100. For the sake of clarity, vending kiosk 100 is illustrated without interior machinery. Vending kiosk 100 includes a cold storage unit 101 which is preferably a freezer cooled by refrigeration equipment (including a compressor/condenser, evaporators fans, filters, and tubing) housed in a refrigeration equipment unit 102, an oven compartment 103 housing additional components, including a rapid cook oven described below, and service doors 104, 105.

The refrigeration equipment unit 102 includes refrigeration equipment (e.g., a freezer) for maintaining the interior of the cold storage unit 101 at a predetermined temperature. Such refrigeration equipment is known in the art and will not be described in detail here. In one embodiment, the predetermined temperature is below freezing in order to extend the shelf life of the food products stored therein.

Service door 104 may include an optional Digital Signage screen 110. Service door 105 may include a convex-shaped section adjacent to a flat service door; however, this shape is not necessary for the invention and is not illustrated here. Service doors 104, 105 may be lighted with decorative LED lights or contain other graphical or attractive elements. A delivery chute 106 is located in service door 105 such that food products can be discharged from vending kiosk 100. A tamper barrier 111 helps prevent tampering with the interior of the vending kiosk via the delivery chute.

Various user interface features are on service door 105. A touchscreen display 107 is used for a customer to select and to display various information. The touchscreen display 107 can be used to both present menu options to the user and to accept responses from the customer. A multi-function card reader 108 accepts payment in cooperation with a PIN pad 109.

Figure 2:
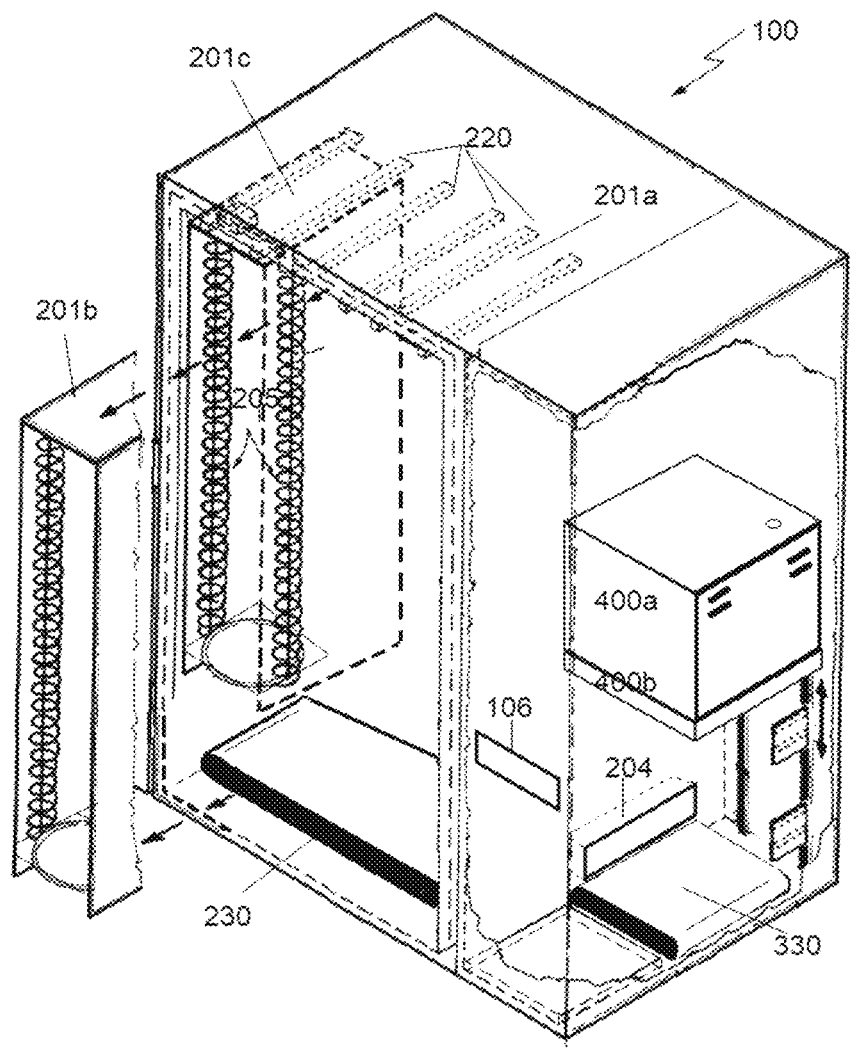
FIG. 2 is a perspective view of the vending machine of FIG. 1 without front service doors, showing components within the interior of the vending machine.

FIG. 2 is a perspective view of the vending kiosk 100 without the service doors 104, 105, showing components within the interior of vending kiosk 100. Some portions of vending kiosk 100 are cut away to better illustrated components within. The interior of vending kiosk 100 includes, among other components discussed below, the cold storage unit 101, with the food products/boxes (i.e., food-containing packages) stored vertically in a plurality of columns (201*a*, 201*b*, 201*c*) comprising an active shelving system. The active shelving system allows for storage of food products/boxes (i.e., packaged food, such as frozen pizza) in a space-efficient manner and avoids a storage area where the packages at the bottom of the column are crushed from the weight of the packages stacked above. In one embodiment, each box has an open top and an open front; the box is folded such that it results in a 3-sided tray.

Figure 3:
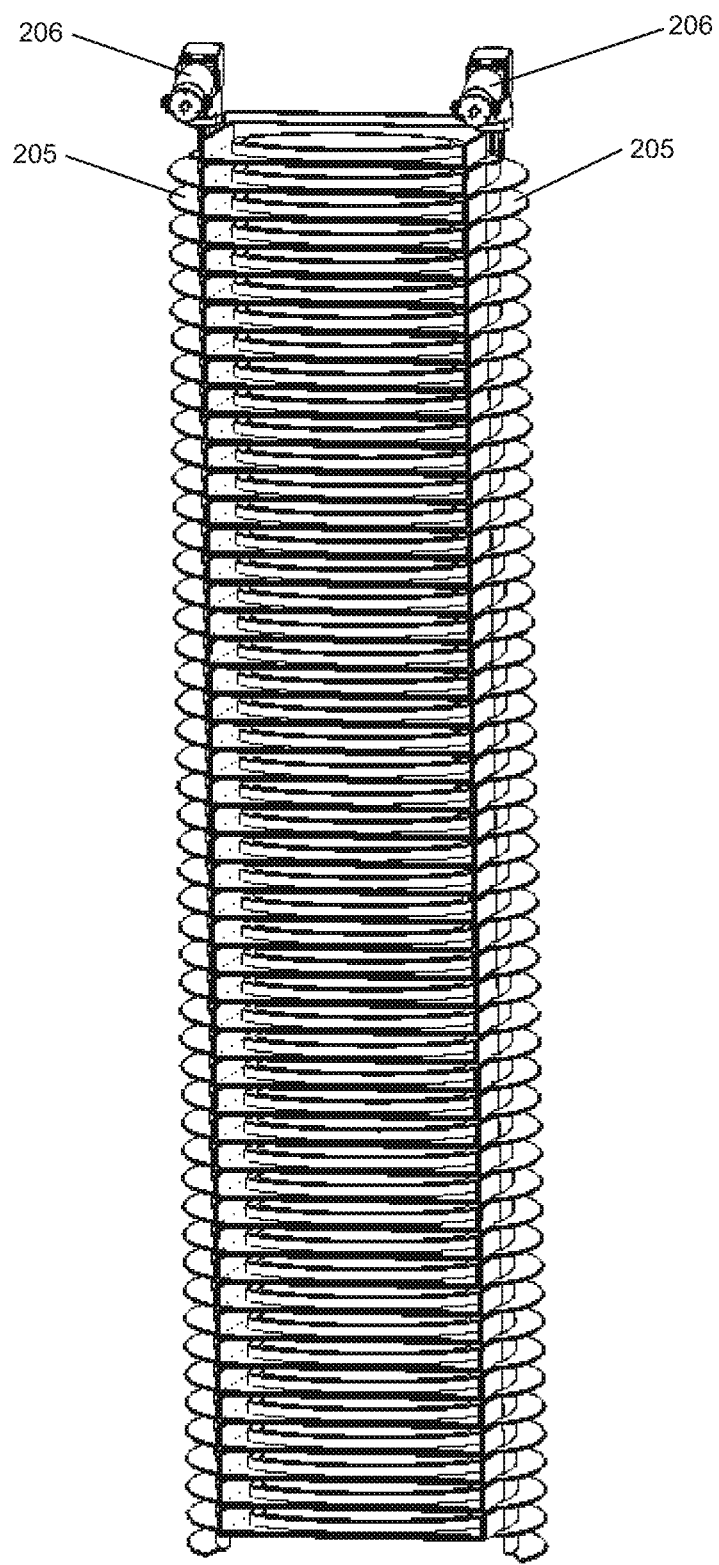
FIG. 3 is a perspective view of a single stack of an exemplary auger-type system.
Figure 4:
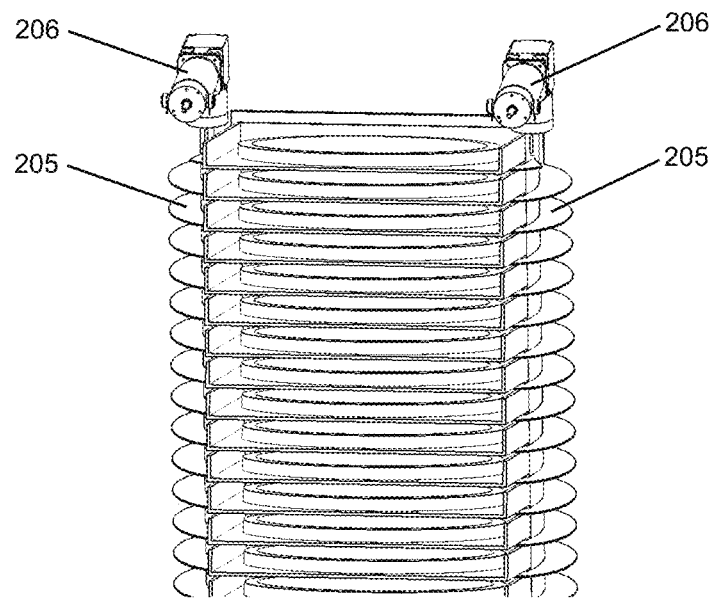
FIG. 4 is a partial perspective view of the single stack of the auger-type system.
Figure 5:
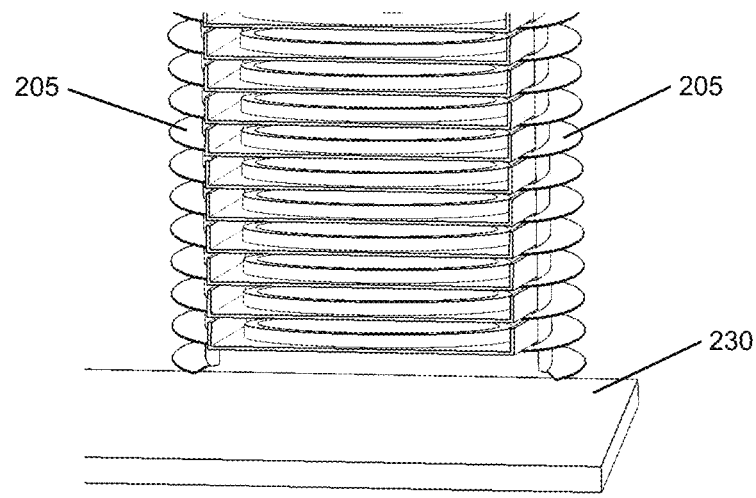
FIG. 5 is a partial perspective view of the single stack of the auger-type system.

FIG. 3, FIG. 4, and FIG. 5 show food products/boxes supported in an exemplary auger-type system, wherein a column of food products/boxes is supported between two parallel Archimedes screws 205. Screw actuators 206 turn the screws 205 to cause a box/food product to drop onto a storage unit conveyor 230.

Returning to FIG. 2, the vertical conveyors are mounted to a pair of horizontal guides 220 affixed to a plate that slides out of the cold storage unit 101. This enables loading of the columns (201*a*, 201*b*, 201*c*) with pizzas on trays. FIG. 2 shows an auger-style storage system with the middle column 201*b* in the slide-out position. The storage unit conveyor 230 moves the box/food product from below the vertical column through a storage unit (e.g., freezer) opening 204 which is covered by an insulated hatch (not shown for clarity). An oven-side conveyor 330 completes the transfer of the box/food product out of the storage unit 101 (i.e., freezer). An oven-side transportation mechanism, described below, moves the box/food product from the oven-side conveyor 330 to an oven unit 400*a*, 400*b*, and finally to a customer through the delivery chute 106.

FIG. 3, FIG. 4 and FIG. 5 show the exemplary auger-type system. The outer diameter and pitch of the screws 205 are designed so that a box/food product (i.e., food package) is supported between each thread. Synchronized rotation of the screw 205 lowers the entire column of food products/boxes (i.e., food packages) until an individual box/food product (i.e., food package) drops free of the screws 205 onto the storage unit conveyor 230.

Figure 6:
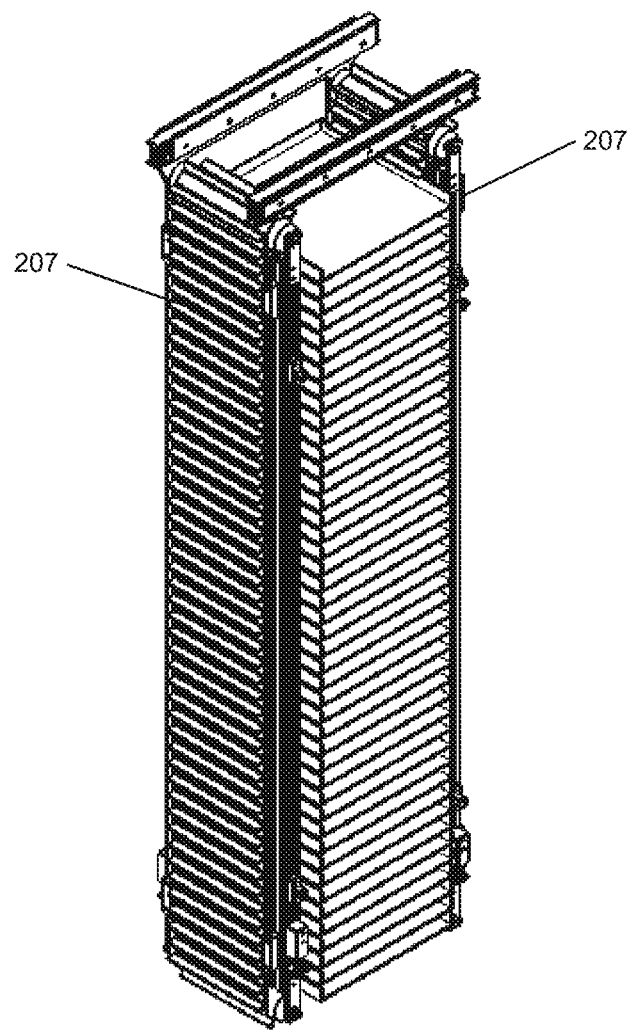
FIG. 6 is a perspective view of a single stack of an exemplary conveyor-type system.
Figure 7:
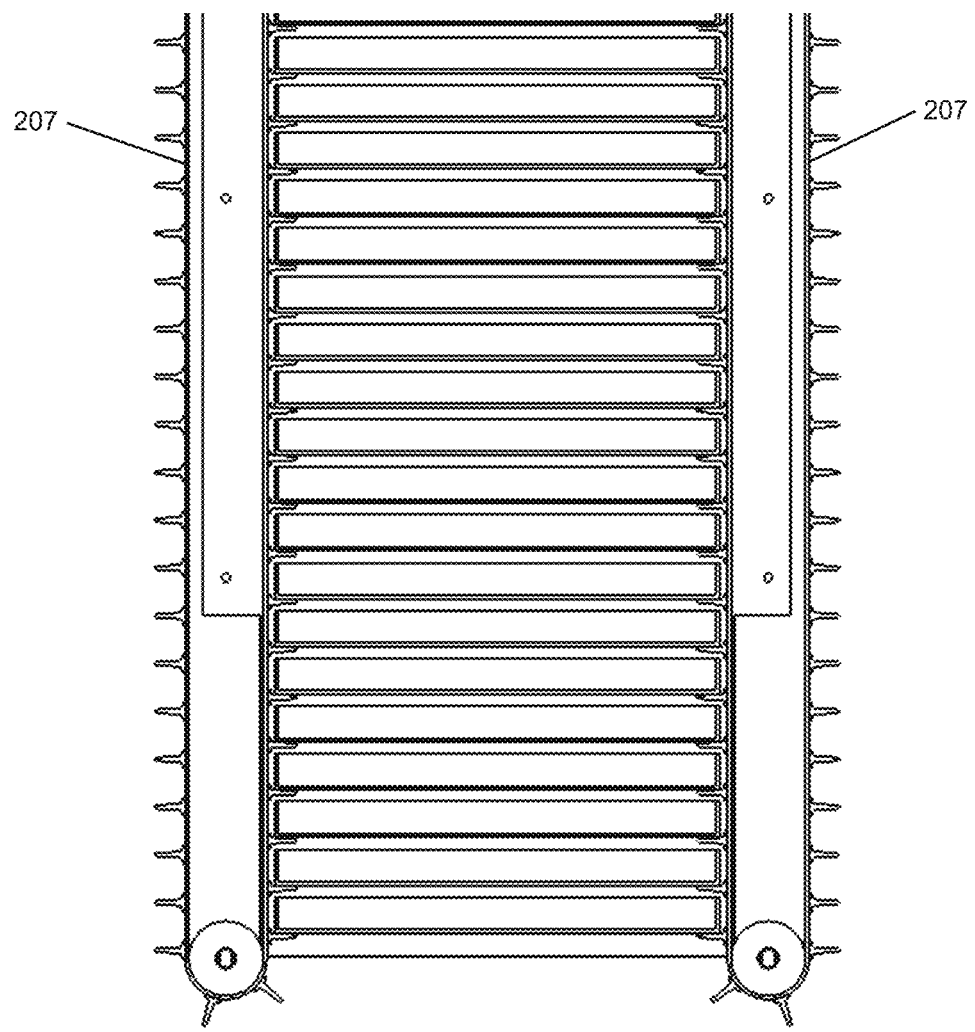
FIG. 7 is a partial front view of the single stack of the conveyor-type system.
Figure 8:
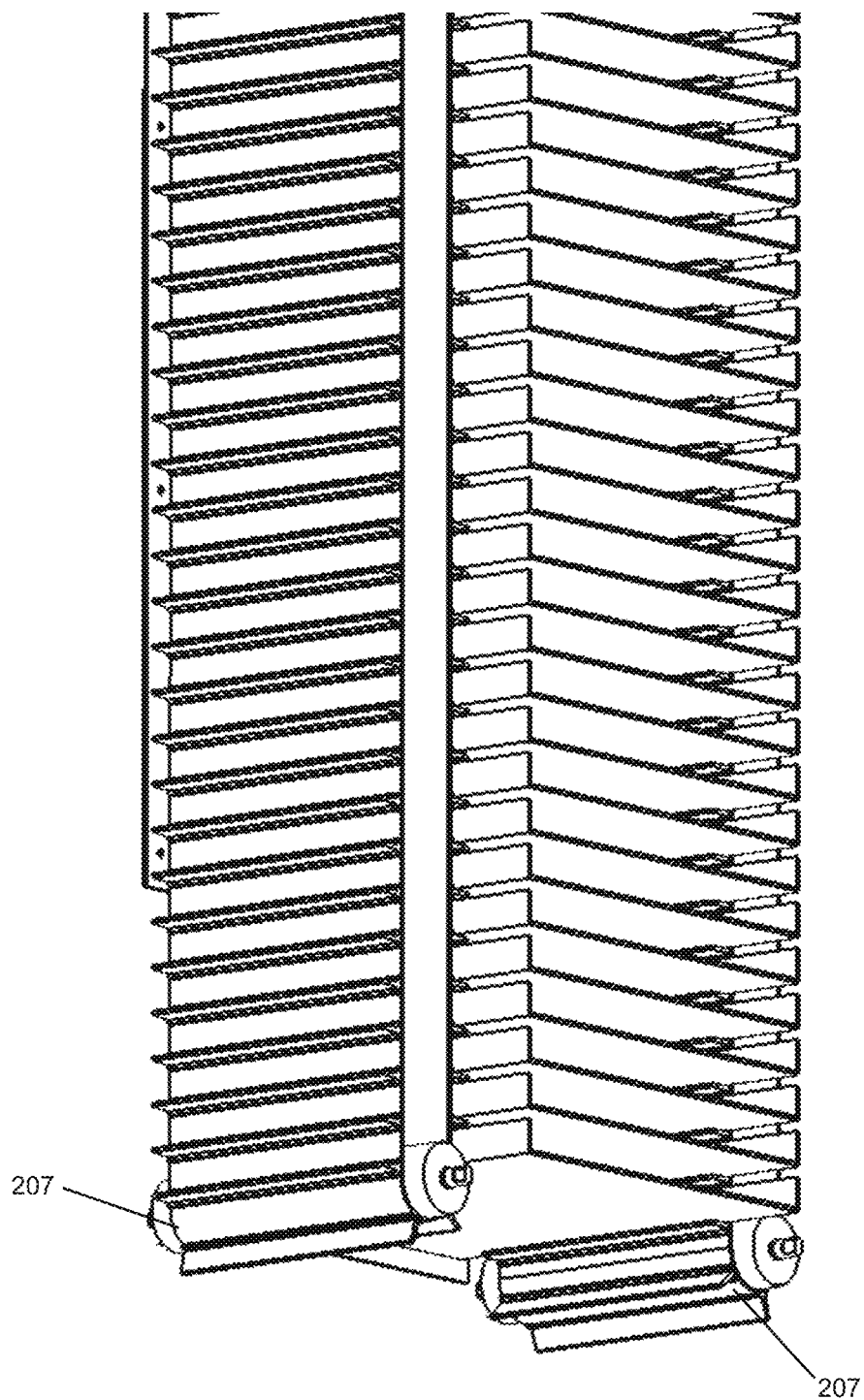
FIG. 8 is partial perspective view of the single stack of the conveyor-type system.

FIG. 6, FIG. 7, and FIG. 8 show an exemplary conveyor-type system wherein a stack of food products/boxes (i.e., packaged foods) is supported between two parallel vertical conveyor belts 207. Cleats attached to the conveyor belts function as support elements. Synchronized movement of the conveyor belts 207 lowers the entire column of food products/boxes (i.e., packaged food) until an individual box/food product drops free of the conveyor belts 207 onto the storage unit conveyor 230 (see FIG. 10).

For both conveyor and auger type systems, multiple shelving columns are arrayed to increase storage capacity and to provide multiple varieties of food products. Each column holds a single food product type (e.g., a pizza type), and the number of shelving columns is directly correlated with the number of selectable varieties.

Figure 9:
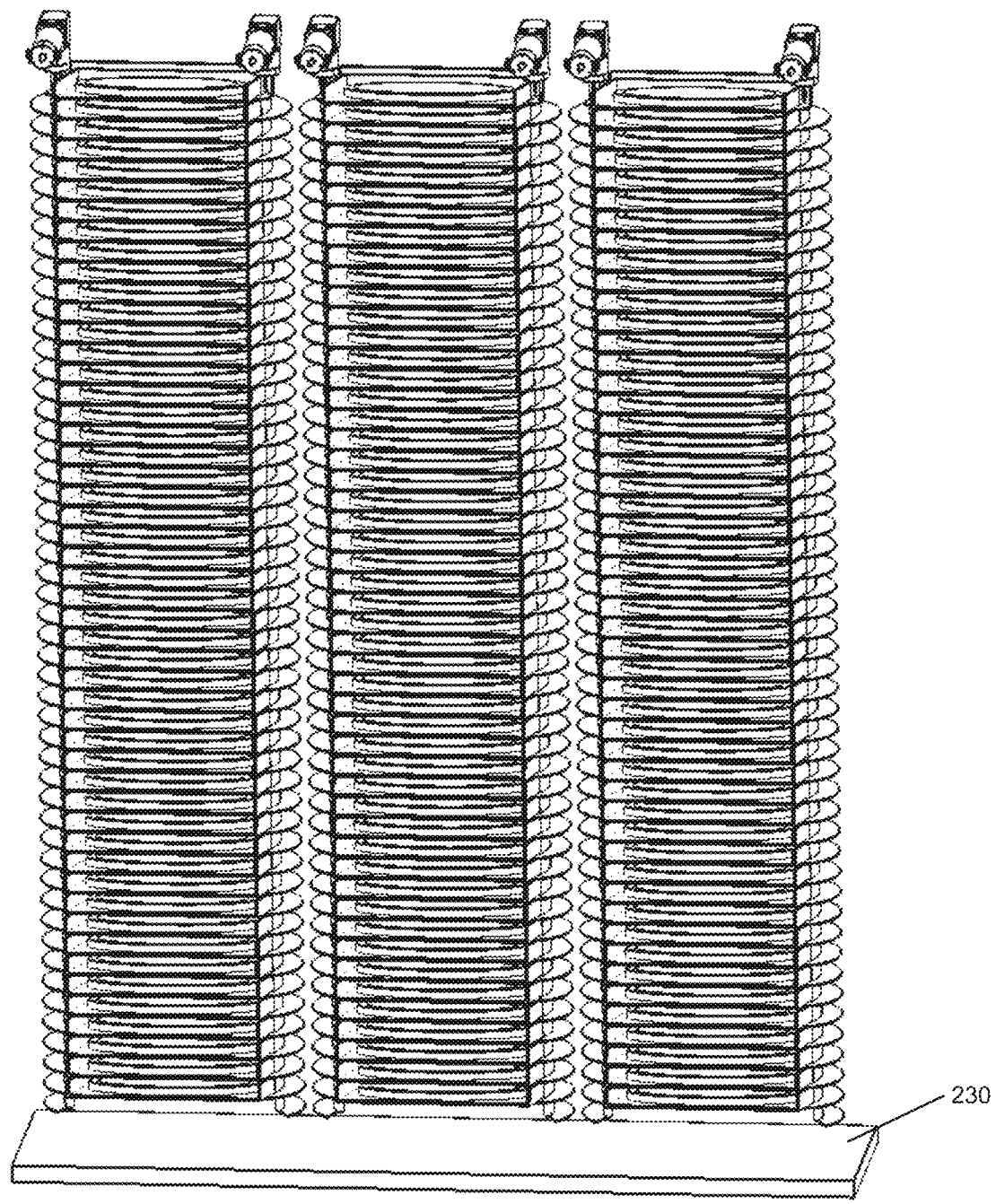
FIG. 9 is a perspective view of the auger-type system with three storage shelving columns.

FIG. 9 shows an exemplary conveyor-type system with multiple shelving columns.

Figure 10:
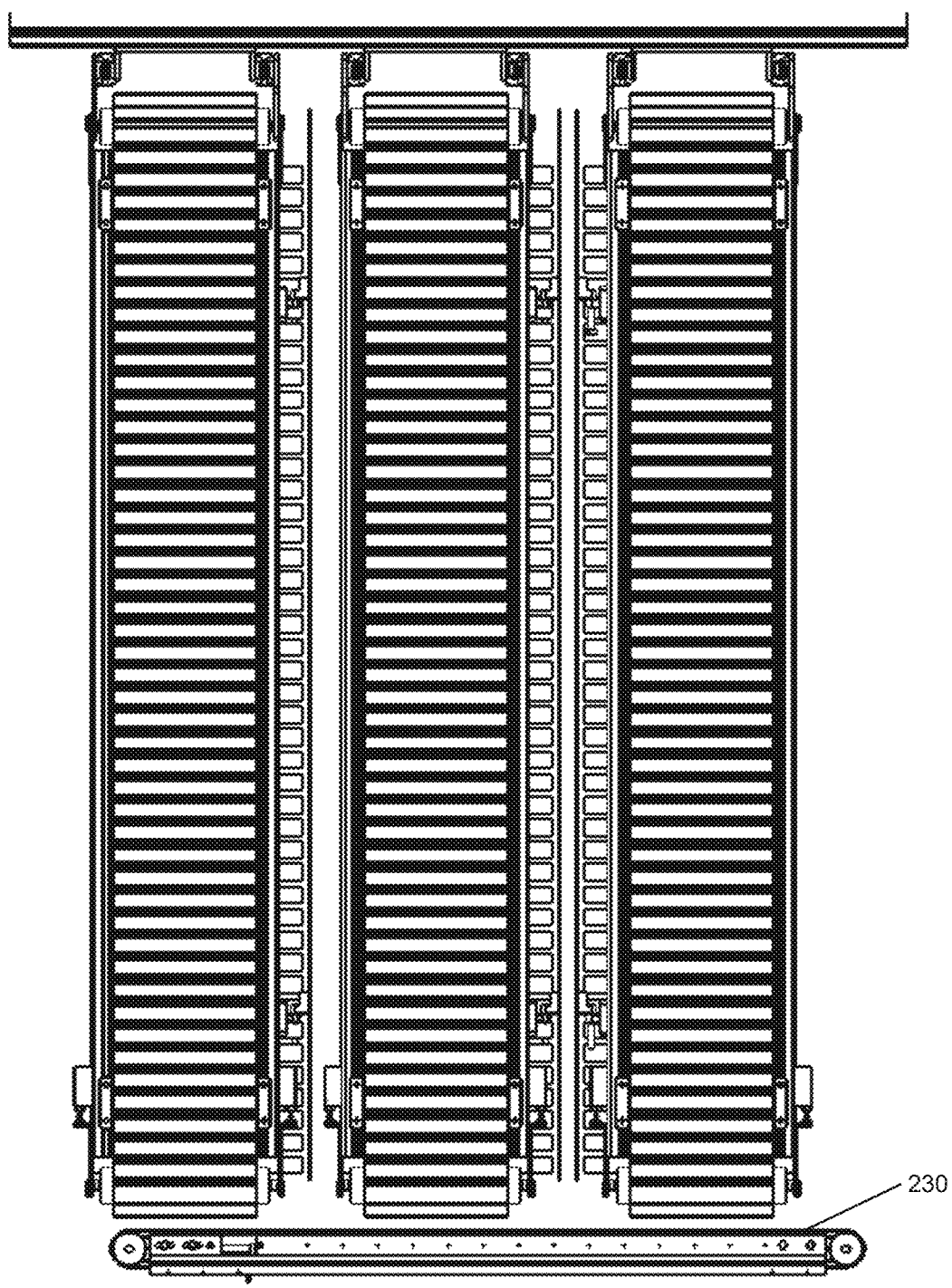
FIG. 10 is a front view of the conveyor-type system with three storage shelving columns.

FIG. 10 shows an exemplary auger-type system with multiple shelving columns.

Figure 11:
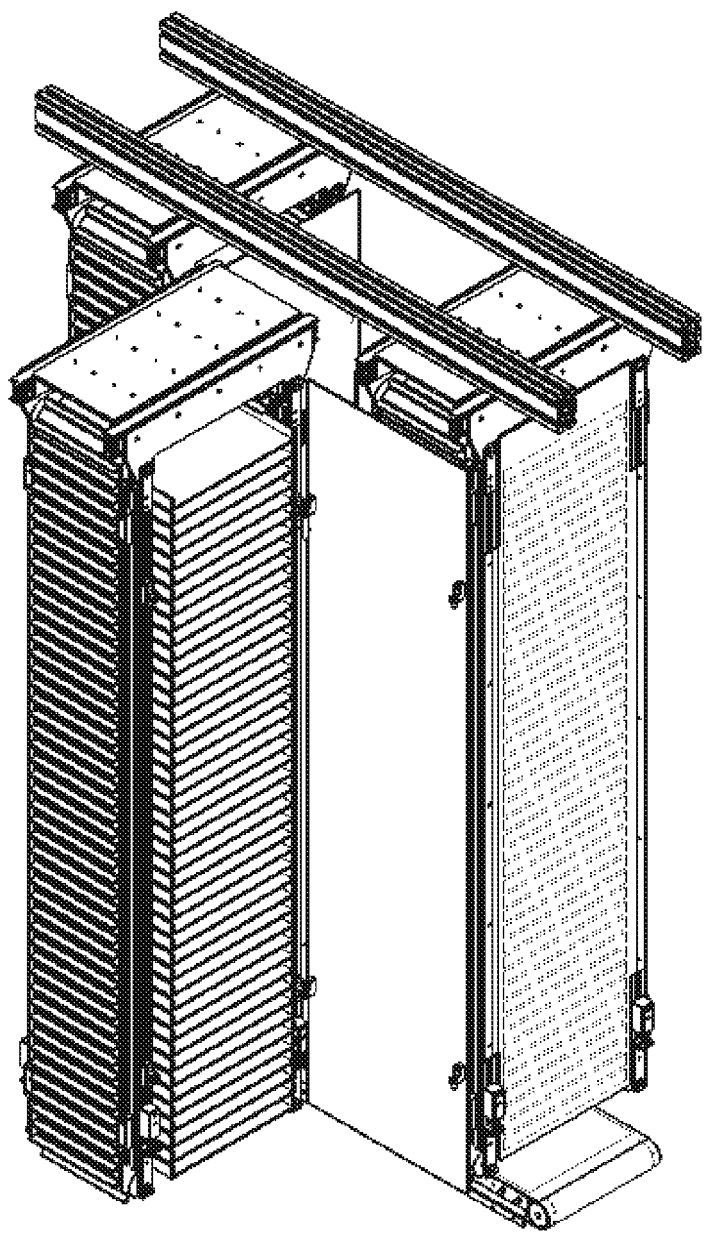
FIG. 11 is a perspective view of the conveyor-type system with a middle column in a 'loading' position.
Figure 12:
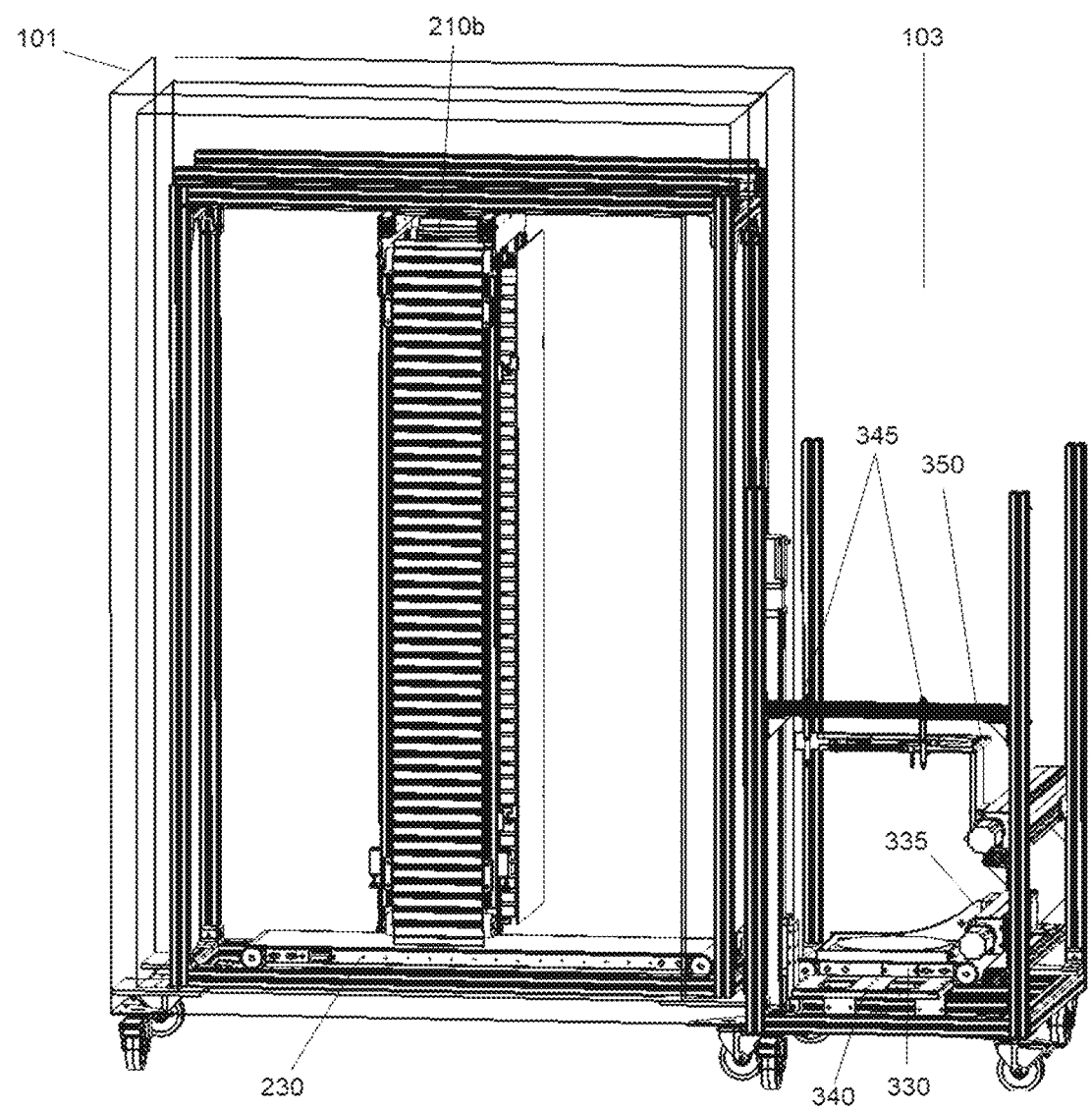
FIG. 12 is a perspective view of a storage unit and a transportation mechanism according to an exemplary embodiment of the invention, with selected elements hidden for clarity.

FIG. 11 and FIG. 12 are perspective views of an exemplary conveyor-type system wherein the shelving columns are very closely spaced in order to minimize the footprint of the food product storage and vending kiosk. In order to facilitate easy replenishment of the food products/boxes, the shelving columns are mounted on telescopic rails which allow an individual shelving column to be pulled out by machine maintenance personnel. Once a shelving column has been pulled out, the maintainer has access to the sides of each column, through which they can remove or replenish food products/boxes. Although a conveyor-type system is shown, one of skill in the art will understand that this telescoping feature may also be used with auger-type systems as well.

The transport mechanism is responsible for moving food products/boxes from the storage unit 101 to the oven unit 400 for cooking, and delivery to a customer.

Figure 13:
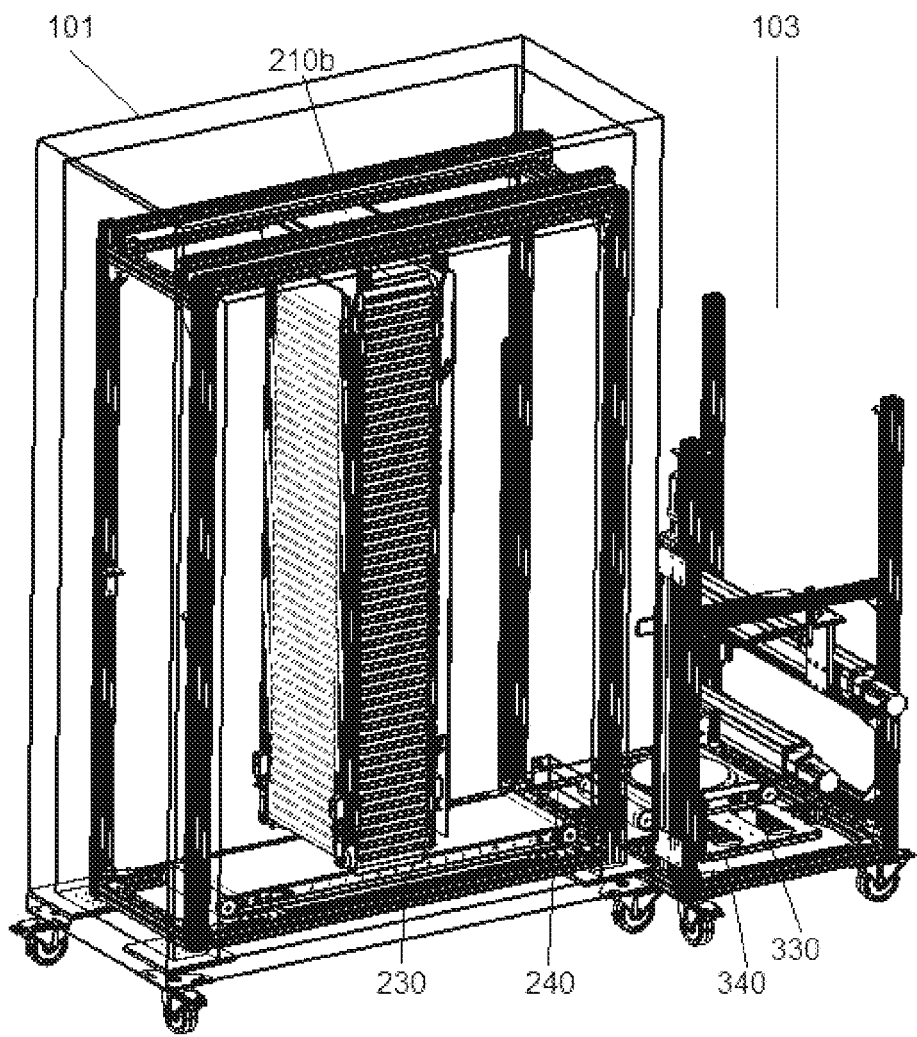
FIG. 13 is another perspective view of the storage unit and transportation mechanism of FIG. 12.
Figure 14:
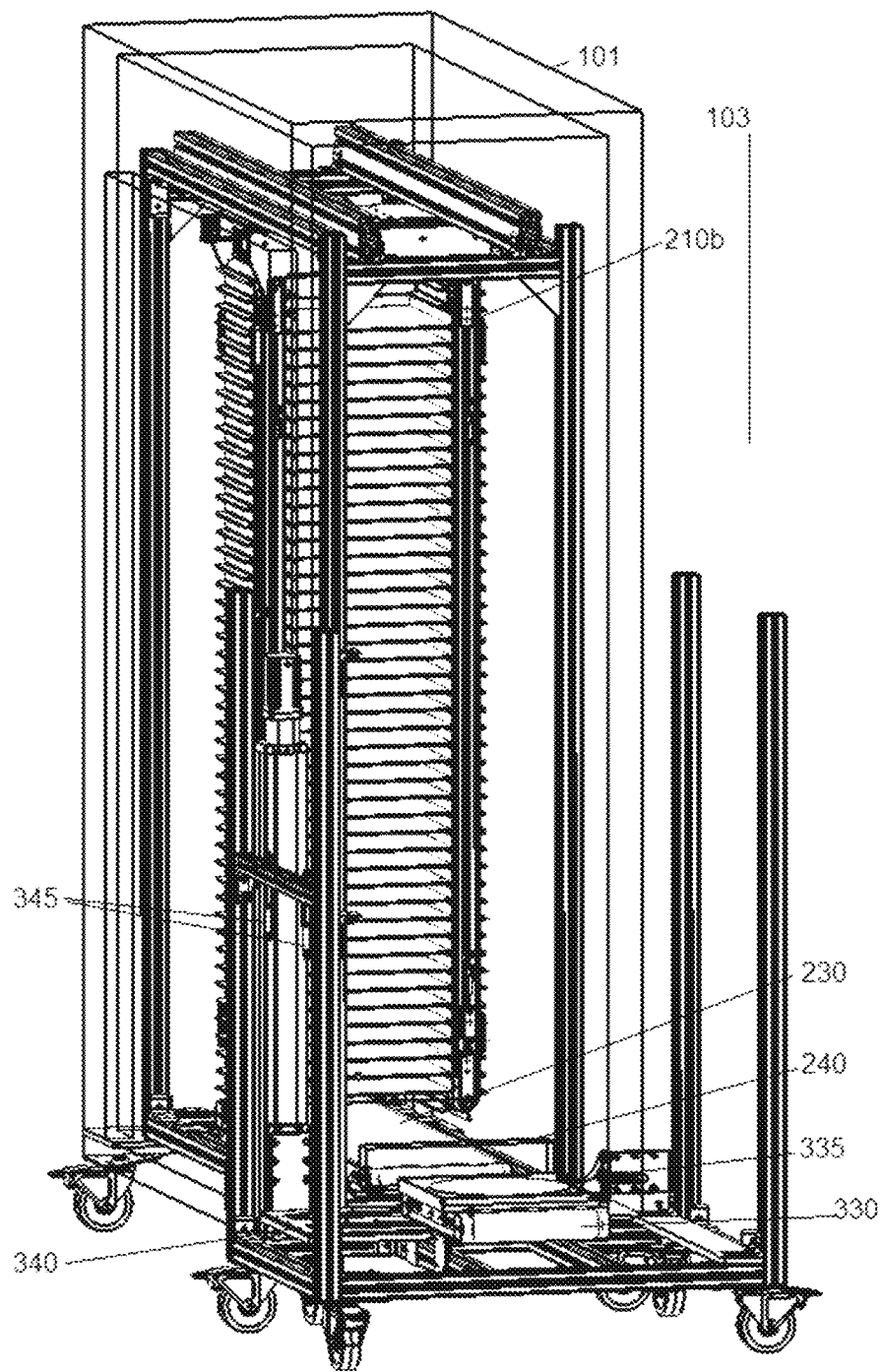
FIG. 14 is another perspective view of the storage unit and transportation mechanism of FIG. 12, with selected elements hidden for clarity.
Figure 15:
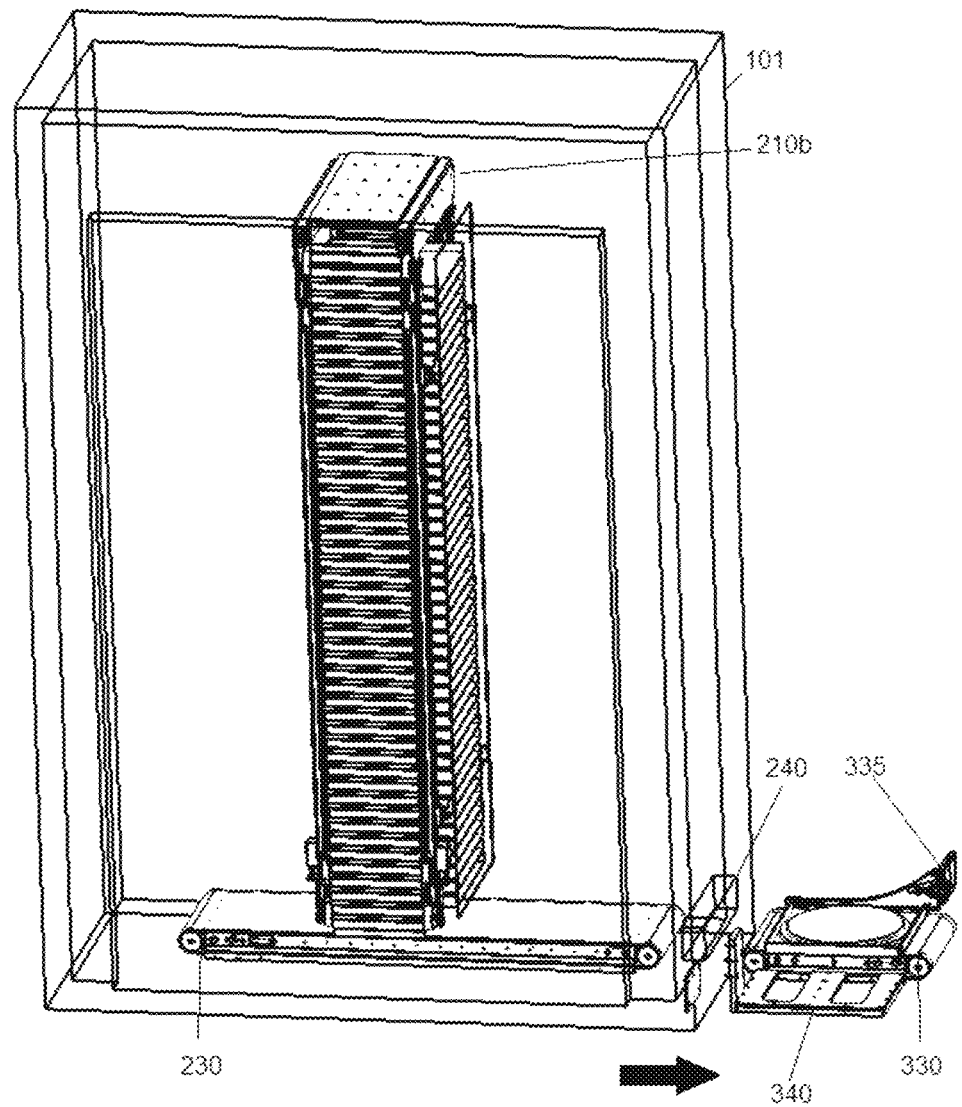
FIG. 15 is another perspective view of the storage unit and transportation mechanism of FIG. 12, with selected elements hidden for clarity.

FIG. 13, FIG. 14, and FIG. 15 are partial perspective views of an exemplary transportation mechanism, with the storage unit conveyor 230 for moving a food product/box out of the storage unit 101. Shown is an outline of the storage unit 101, with the middle stack 210*b* of a conveyor-type system. Below the middle stack 210*b* is the storage unit conveyor 230, which transports the food product/box from a column, through a hatch 240, and to the oven-side conveyor 330. A sweeper arm assembly 335 aligns the food product/box on the conveyor. An elevator platform 340 positioned at its low position is shown. Also shown are box retention fingers 345, discussed further below.

FIG. 16A and FIG. 16B show an exemplary insulated, motorized hatch cover 241 in a semi-open position over the hatch 240.

FIG. 17 shows an exemplary oven-side conveyor 330 with a food product/box (i.e., food package). An exemplary sweeper arm assembly 335 has an arm (see FIG. 18A) that is orthogonal to the motion of the conveyor, and aligns the box. The elevator platform 340 has risen (1-2") to a co-planar position to the oven-side conveyor to receive the box when the sweeper arm assembly 335 pushes the box towards the front of the oven compartment 103.

Figure 18A:
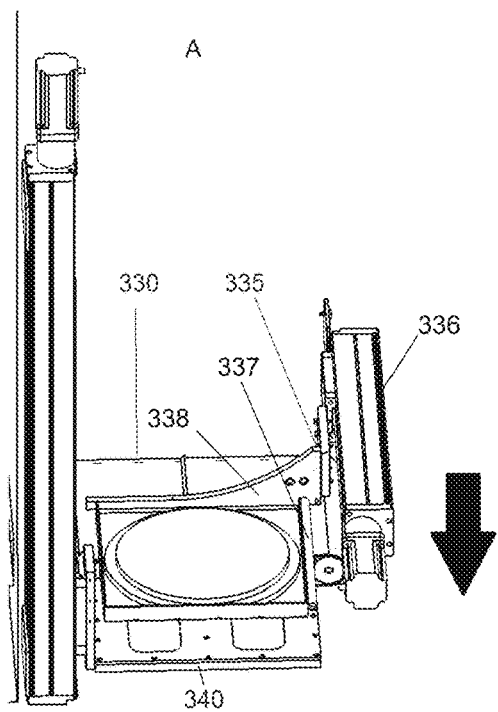
FIG. 18A is a partial perspective view of the exemplary transportation mechanism, with selected elements hidden for clarity, showing the exemplary sweeping actuator and elevator platform of FIG. 17, with a box/pizza in the process of being transferred from the oven-side conveyor to the elevator platform.
Figure 18B:
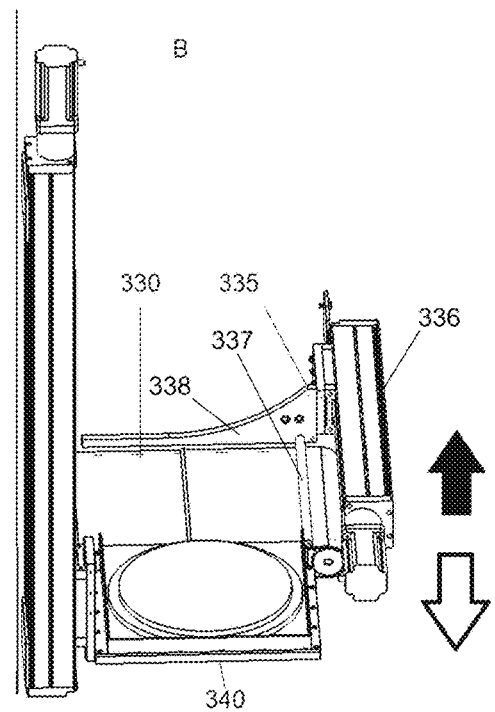
FIG. 18B is a partial perspective view of the exemplary sweeping actuator and elevator platform of FIG. 18A, with the box/pizza on the elevator platform and the sweeping actuator retracted.

FIG. 18A and FIG. 18B show the exemplary sweeper arm assembly 335. A sweeper actuator 336 moves a stopper bar 337 and sweeper bar 338. The stopper bar is oriented perpendicular to the conveyor's direction of travel and provides a surface for the food product/box to stop against in the event of over-travel. The sweeper bar is oriented parallel with the conveyor's direction of travel. The sweeper arm assembly 335 sweeps the food product/box off of the oven-side conveyor 330 and onto the elevator platform 340.

Figure 19A:
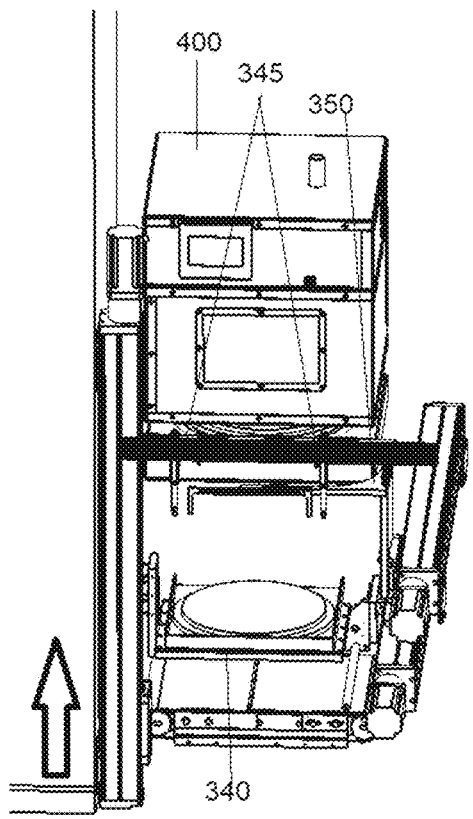
FIG. 19A is a partial perspective view of the transportation mechanism and an oven unit according to the exemplary embodiment of the invention, with selected elements hidden for clarity, showing the exemplary elevator in a position at mid-path.
Figure 19B:
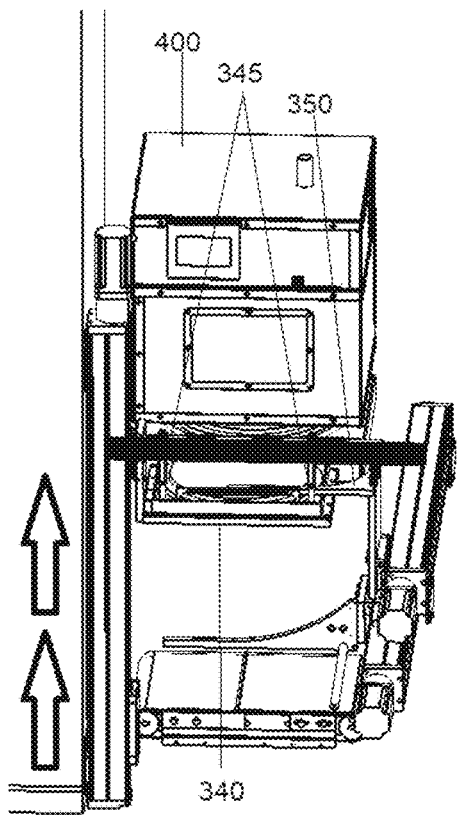
FIG. 19B is a partial perspective view of the exemplary elevator of FIG. 19A in an upper position.
Figure 20:
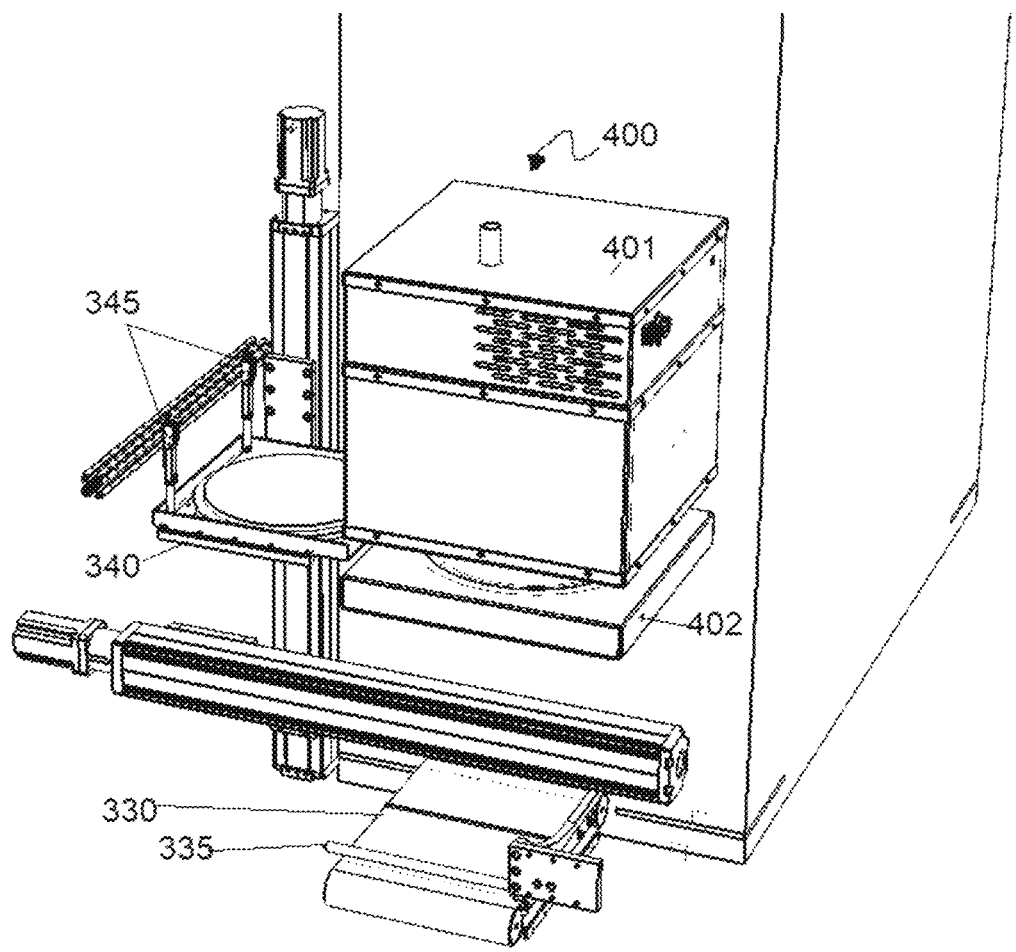
FIG. 20 is another partial perspective view of the transportation mechanism and oven unit, with selected elements hidden for clarity, showing a pair of exemplary box retention fingers engaging the box on the elevator platform.
Figure 21:
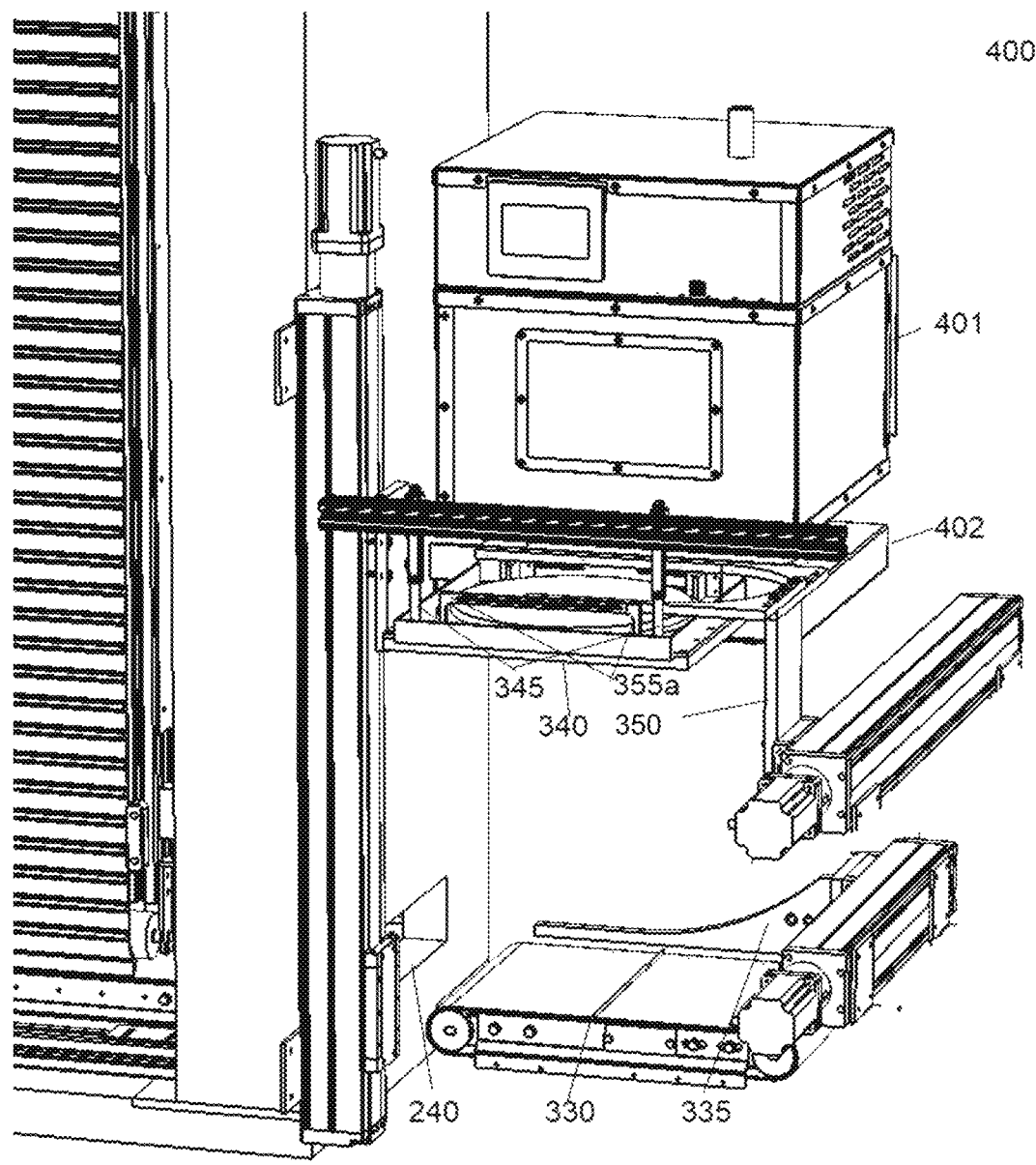
FIG. 21 is a partial perspective of the exemplary vending machine, with selected elements hidden for clarity, showing an exemplary loading end-effector ("wrangler") engaged with the pizza.
Figure 22:
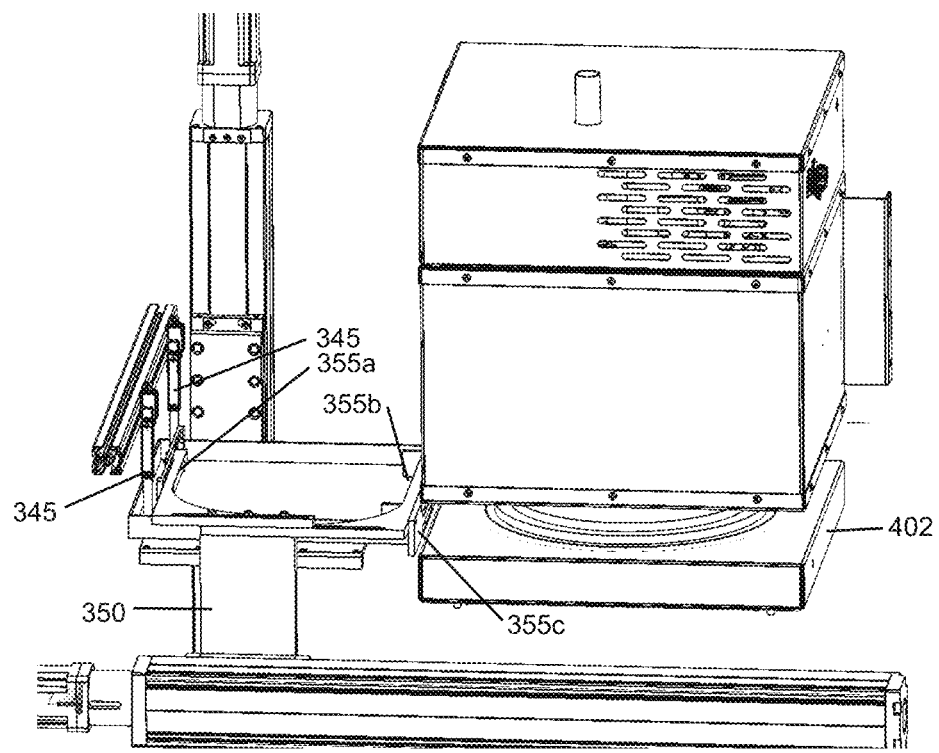
FIG. 22 is another partial perspective view of the transportation mechanism and the oven unit, with selected elements hidden for clarity, showing the exemplary loading end-effector ("wrangler")

FIG. 19A and FIG. 19B show an exemplary elevator assembly, including an elevator actuator which lifts the elevator platform 340 with the food product/box from the bottom of the oven compartment 103 to the oven unit 400. The vertical position of the elevator platform 340 aligns both with the oven unit 400 and also with the delivery chute 106 (see FIG. 1) through which a cooked food product/box is delivered after the food product has been cooked in the oven unit 400. The delivery chute 106 is preferably a comfortable and easily-reachable height above the ground, (between 24" and 38").

FIG. 20, FIG. 21, FIG. 22, FIG. 25A, and FIG. 25B show the box retention fingers 345, which are small actuators in an extended position. When the elevator platform 340 with the food product/box has been raised to a proper height, the box retention fingers 345 extend downward to capture the box and prevent it from sliding.

FIG. 21 thru FIG. 24, FIG. 26A thru FIG. 26D, and FIG. 27 show a loading end-effector ("wrangler") assembly 350 including a front-side member 355a that touches an edge of the food product at two points of contact in order to assist in self-centering of a round food product (e.g., pizza). The wrangler assembly 350 also includes a loading/unloading actuator for causing the front-side member 355a to push the food product out an open front of the box into the oven unit 400.

The transport mechanism for moving the food product out of the box and back into the box following heating utilizes the wrangler assembly 350. This shepherding device is able to guide the transfer of the food product out of the box and onto a deck 402 of the oven unit 400. Upon completion, a back-side member 355b of the wrangler with an attached optional scraper 355c to clear a surface of the base oven deck 402, will steer the hot food product off the hot base oven deck 402 and onto the unheated box, additionally, clearing the clearing the surface of the base oven deck 402, and brushing crumbs off the edge of the base oven deck 402 between a gap between the box and the oven, into a crumb tray below, located on the floor of the oven compartment.

The loading/unloading actuator moves the wrangler assembly 350 and is responsible for pushing the food product into the oven unit (from the front), and also for pushing the food product out (from the rear) after cooking.

FIG. 25A and FIG. 25B show an optional motorized lifting module 360. The motorized lifting module 360 raises the wrangler assembly 350 just enough (1.2") to clear the height of the food product as the wrangler moves to and from the rear (i.e., the base oven deck). This actuator may be omitted if cost is a factor, in which case the oven's loading platform drops enough to allow the wrangler assembly 350 to move above the food product on its way to and from the rear.

Once the wrangler assembly 350 has been positioned behind the food product, the loading/unloading actuator moves forward and sweeps the cooked food product back into the box. The box retention fingers 345 then rise via retraction of mini-actuators and release the box, and the loading actuator keeps moving forward, pushing both the cooked food product and box out through the delivery chute 106 (FIG. 1), which is aligned with the oven platform.

Figure 23:
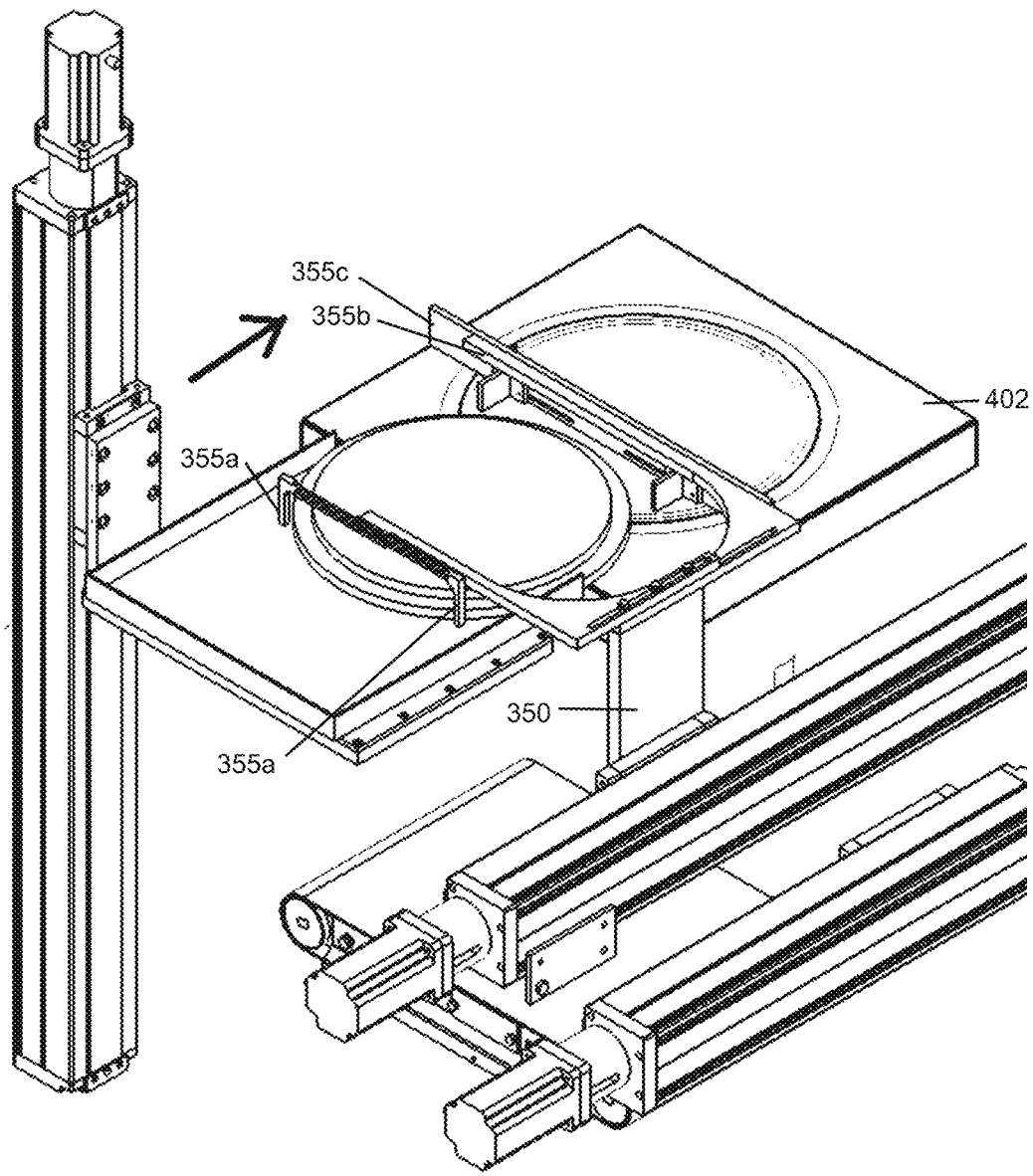
FIG. 23 is another partial perspective view of the transportation mechanism and the oven unit, with selected elements hidden for clarity, showing the oven unit with the base lowered to the open/loading position and the wrangler in the process of transferring the pizza to the oven unit.
Figure 24:
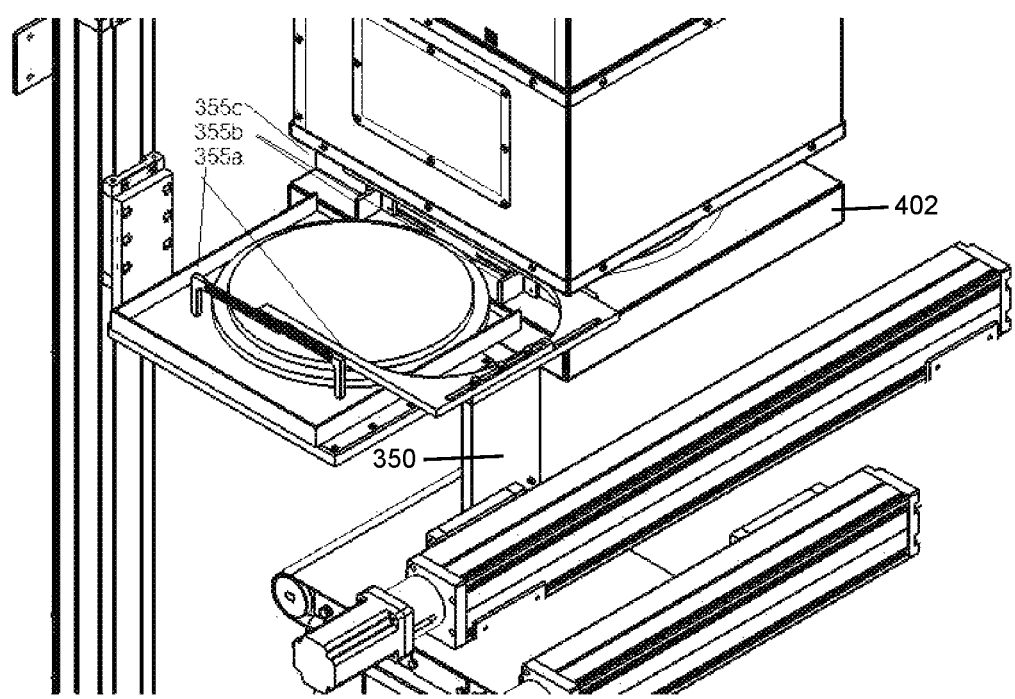
FIG. 24 is another partial perspective view of the transportation mechanism and the oven unit, with selected elements hidden for clarity, showing the oven unit with the base lowered to the open/loading position and the wrangler in the process of transferring the pizza to the oven unit.
Figure 26A:
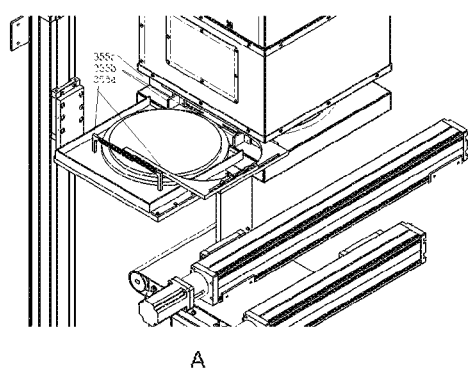
FIG. 26A-26D are other partial perspective views of the transportation mechanism and the oven unit, with selected elements hidden for clarity, showing the wrangler in the process of transferring the pizza to and from the oven, and preparing to dispense the box/pizza.
Figure 26B:
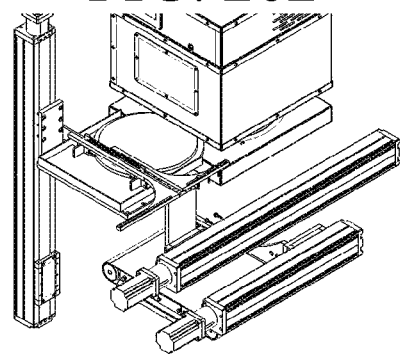
Figure 26C:
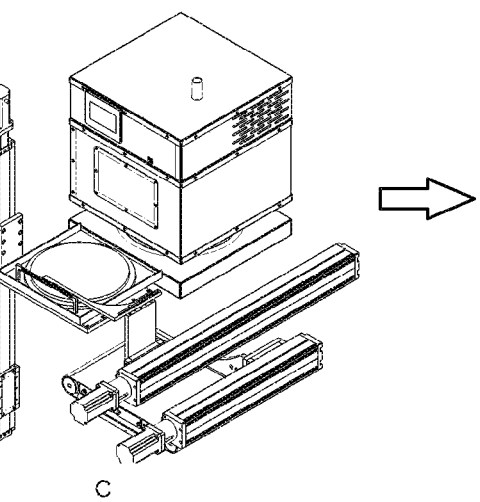
Figure 26D:
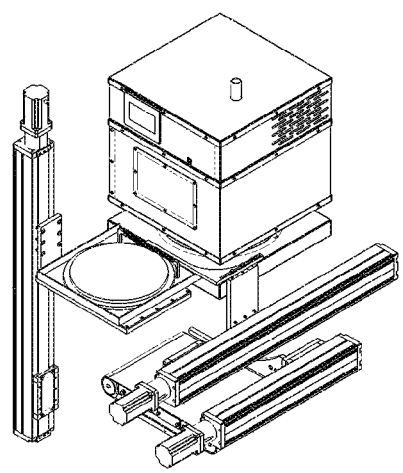

As shown in FIG. 23, the back-side of the wrangler 355b establishes two points of contact, and their separation is also adjustable to accommodate varying pizza diameters. They are used to push pizza out of the oven and back into the box after cooking.

Figure 27:
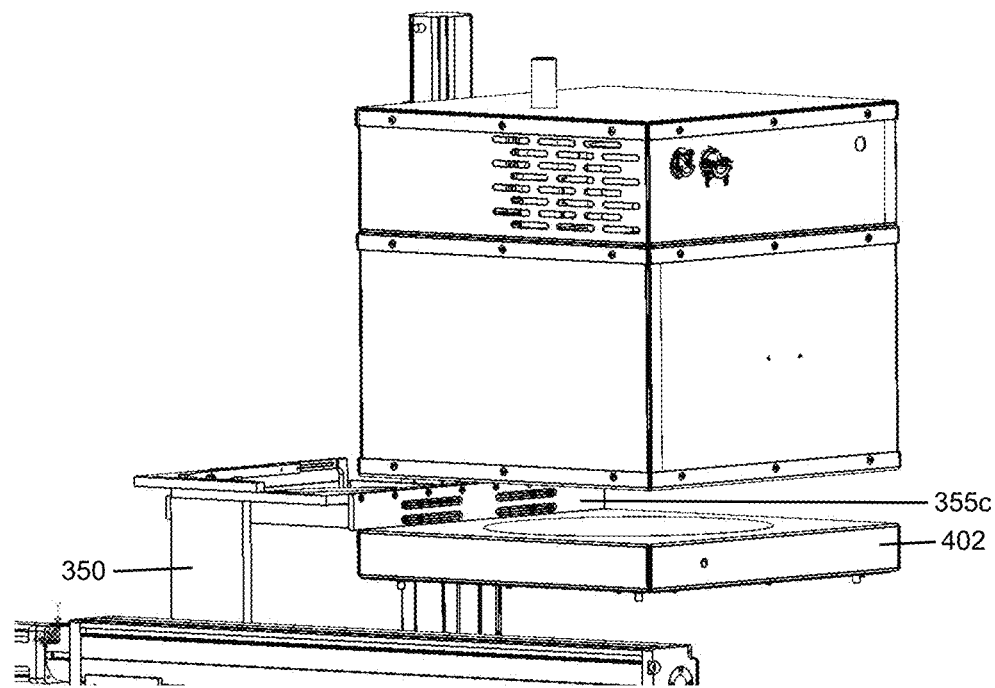
FIG. 27 is another partial perspective views of the transportation mechanism and the oven unit, with selected elements hidden for clarity, showing an exemplary 'scraper' attachment acting on an oven platen surface as the wrangler pushes the pizza into the tray.

As shown in FIG. 27, a scraper is a flat, wide feature that is designed to scrape the surface of the oven platform and dislodge any debris that may have adhered to the surface after a cooking cycle. The bottom surface of the scraper maintains physical contact with the oven platform, dislodging debris as the wrangler is swept across the oven platform during pizza loading and unloading. A gap (<1") between the oven platform and the box provides a place for scraped debris to fall and be collected.

Figures 28A, 28B:
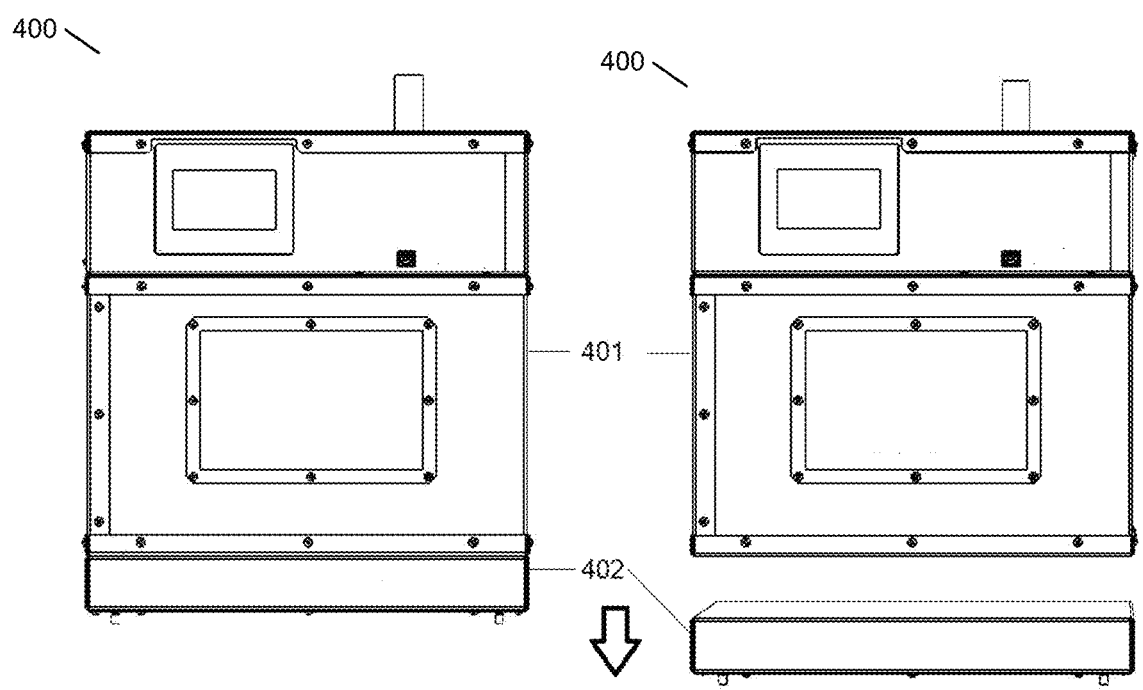
FIG. 28A is a front view of the oven unit showing the bottom raised to a closed/cooking position.
FIG. 28B is a front view of the oven unit showing the bottom lowered to an open/loading position.
Figure 29:
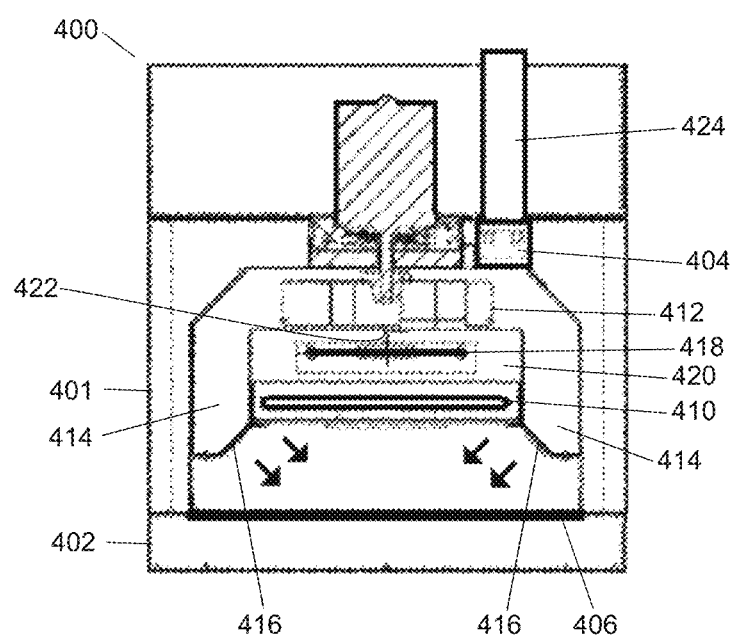
FIG. 29 is a cross-section of the oven unit
Figure 31:
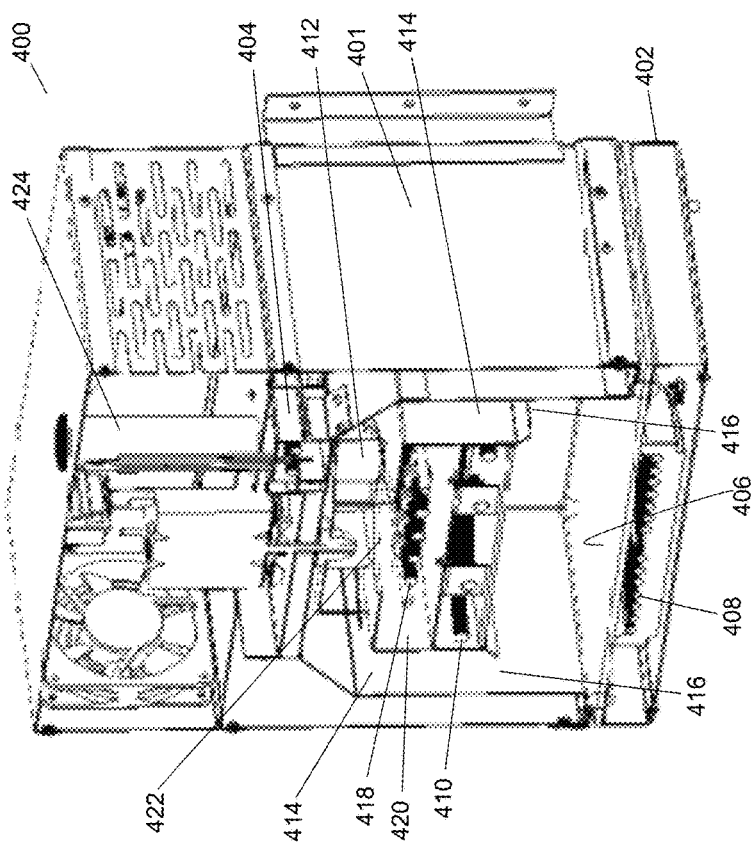
FIG. 30 is a partial perspective view of the oven unit showing a front-back slice of the oven unit and FIG. 31 is a partial perspective view of the oven unit showing a left-right slice of the oven unit.
Figure 30:
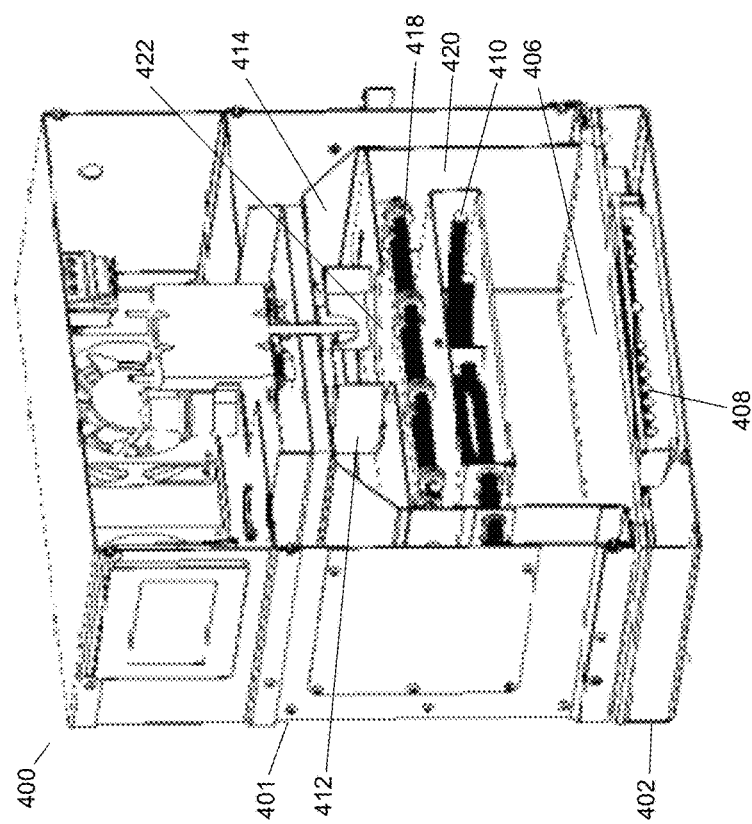

FIG. 28A, FIG. 28B, and FIG. 29 show the elements of the oven unit 400 for the preparation of the food product (e.g., pizza) utilizes multiple cooking methods. The specialized "rapid cook" unit features three fundamental heat transfer methods: forced convection air impingement, [Infrared] radiation, and [deck] conduction, NOT using microwave technology. The combination leads to faster preparation of the pizza. The base oven deck 402 [platen] operates as a deck oven; providing a solid surface to support the pizza. The oven unit 400 is comprised of a main body 401 and the base oven deck 402; where both parts are insulated. Furthermore, the oven is opened by lowering the base oven deck 402 relative to the main body 401. This open-side down design helps to retain heat within the oven even during the insertion and removal of the food product to/from the oven. The oven unit 400 is equipped with a catalytic converter 404 on the exhaust, which breaks down grease-laden vapors and smoke for ventless operation. Each of the heating components can be controlled individually by an oven controller.

This design ensures to keep as much heat within the oven as possible during introducing the food product and taking out the food product from the oven. Oven temperature may vary in a range from about 400° F. to about 600° F. based on factors such as time since the previous food product was prepared, frequency of food product orders, and the type of food product currently being prepared, in addition to a preheat time.

The base oven deck 402 includes a heated platen 406 that comes in direct contact with the food product. In a standby mode, as shown in FIG. 28A, the base oven deck 402 is in a raised position in contact with the main body 401. When a food product is ordered, the base oven deck 402 lowers to a position to accept the food product. Once the food product is placed on the base oven deck 402, the base oven deck 402 rises to meet the main body 401. In one embodiment, the base oven deck 402 is a thin stainless steel "box" with an aluminum platen on top. The "box" is fully insulated with ceramic fiber insulation. The platen 406 is warmed by an electric heater 408 encased in the base. The metal platen 406 reaches cooking temperature quickly, as aluminum has a much better thermal conductivity than steel. Other embodiments may include glass ceramic as the material of the platen 406.

The main body 401 of the oven unit 400 delivers both radiant and convective heat to the food product. FIG. 29 is an illustrative cross section of the oven unit showing a center area of the oven having circular radiant elements 410. The circular radiant elements 410 reach cooking temperatures in 10 to 15 seconds. The circular radiant elements 410 deliver most of the energy provided to the product in the beginning of the cook cycle. Located on top of the oven unit is a motor-driven fan 412 that pressurizes a plenum 414 on both sides of the oven cavity. The plenum 414 feeds opposite sides of the oven cavity to impingement jets 416 that deliver heated air to exposed surfaces of the food product. The heated air is warmed by open coil heaters 418 located in a return duct 420 just before a return opening 422 to the motor driven fan 412.

The oven unit 400 includes a vent 424 located in the main body 401 open to the plenum. As air exits the oven unit, it passes through an electrically heated catalyst. The catalyst removes undesirable hydrocarbons before they exit the oven unit 400. This allows the kiosk to be placed indoors without additional venting to the outside, allowing ventless operation.

The working steps of the exemplary food product storage and vending kiosk 100, a described above, are:

A customer orders a food product (e.g., a pizza) with the user interface;

If an internal temperature of the oven unit is not sufficient, a preheat cycle on the oven begins;

A food product in a box folded as a tray is released from the column from within the storage unit;

The hatch opens the slot from the storage unit;

The transfer mechanism transfers the food product in the box (tray) out of the freezer compartment;

The transfer mechanism moves the food product in the box (tray) off the horizontal conveyor and onto the elevator platform;

The elevator assembly raises the food product and box (tray) in close proximity to the base oven deck;

A pair of box retention fingers secures the box (tray) on the elevator platform;

The base oven deck lowers to receive the food product;

The wrangler pushes the food product out of the box (tray) and onto the base oven deck;

The base oven deck rises to close the oven unit and begins the cook cycle, which is less than 180 seconds;

Upon completion of the cook cycle, the oven unit opens by lowering the base oven deck from the oven main body;

The food product is taken from the oven unit using the back-side of the wrangler to push the food product off the base oven deck back into the box (tray);

The box retention fingers securing the box (tray) release; and

The food product in the box (tray) is pushed through the delivery chute to the customer.

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A food product storage and vending kiosk comprising:
a cold storage unit including a plurality of food packages, an active shelving system storing the plurality of food packages, and a refrigerator for maintaining an interior of the cold storage unit at a predetermined temperature, each of the food packages including a food product in a box;
an oven unit including a base oven deck for receiving the food product and rising to meet and seal with a main body to form a sealed oven cavity for cooking the food product; and
a transportation mechanism for moving a food package out of the cold storage unit, onto an elevator platform that lifts the food package to the oven unit, pushing the food product from the box onto the base oven deck for cooking, and pushing the food product off of the base oven deck into the box and out of a delivery chute of the kiosk after cooking;
wherein the box of each of the plurality of food packages has an open top and an open front forming a three-sided tray containing the food product, and wherein the active shelving system includes a plurality of columns of shelf elements supporting and dispensing the plurality of food packages;
wherein the cold storage unit defines a hatch between an interior of the cold storage unit and an oven compartment wherein the oven unit is located, and includes a motorized hatch cover over the hatch; and
wherein the transportation mechanism includes a storage unit conveyor below the active shelving system and an oven-side conveyor in alignment with the hatch, the storage unit conveyor and the oven-side conveyor for transporting a food package from the storage unit, through the hatch, and into the oven compartment;
wherein the transportation mechanism further includes a sweeper arm assembly and an elevator assembly positioned at opposite sides of the oven-side conveyor,
the elevator assembly including the elevator platform and an elevator actuator for lifting the elevator platform from a bottom of the oven compartment to the oven unit and the delivery chute; and
the sweeper arm assembly including a stopper bar oriented perpendicular to a direction of travel of the oven-side conveyor, a sweeper bar oriented parallel with the direction of travel of the oven-side conveyor, and a sweeper actuator for causing the sweeper bar to sweep the food package off the oven-side conveyor and onto the elevator platform.

2. The food product storage and vending kiosk of claim 1, wherein the transportation mechanism further includes a pair of box retention finger actuators and a wrangler assembly located in the oven compartment at the oven unit;
the box retention finger actuators engaging the box of the food package when the elevator actuator has lifted the elevator platform to the oven unit;
the wrangler assembly including a front-side member, a back-side member, and a loading/unloading actuator, the loading/unloading actuator for causing the front-side member to push the food product out the open front of the box onto the base oven deck before cooking and for causing the back-side member to push the food product from the base oven deck back into the box after cooking, and then, after retraction of the box retention finger actuator, pushing the food product and box out through the delivery chute.

3. The food product storage and vending kiosk of claim 2, wherein the wrangler assembly further includes a motorized lifting module for raising the front-side member and back-side member of the wrangler assembly enough to clear the food product as the loading/unloading actuator moves back to the elevator platform after pushing the food product onto the base oven deck before cooking and back to the base oven deck before pushing the food product back into the box after cooking.

4. The food product storage and vending kiosk of claim 2, wherein the back-side member of the wrangler further includes a scraper to scrape crumbs off a surface of the base oven deck into a gap defined between the base oven deck and the box as the loading/unloading actuator causes the back-side member of the wrangler assembly to push the food product from the base oven deck back into the box after cooking.

* * * * *